United States Patent
Segawa

(10) Patent No.: US 10,183,693 B2
(45) Date of Patent: Jan. 22, 2019

(54) ELECTRIC POWER STEERING DEVICE

(71) Applicant: NSK LTD., Tokyo (JP)

(72) Inventor: Toru Segawa, Maebashi (JP)

(73) Assignee: NSK LTD., Tokyo (JP)

( * ) Notice: Subject to any disclaimer, the term of this patent is extended or adjusted under 35 U.S.C. 154(b) by 24 days.

(21) Appl. No.: 15/327,074

(22) PCT Filed: Apr. 24, 2015

(86) PCT No.: PCT/JP2015/062572
§ 371 (c)(1),
(2) Date: Jan. 18, 2017

(87) PCT Pub. No.: WO2016/047189
PCT Pub. Date: Mar. 31, 2016

(65) Prior Publication Data
US 2017/0144695 A1 May 25, 2017

(30) Foreign Application Priority Data

Sep. 26, 2014 (JP) ................................. 2014-196278
Nov. 5, 2014 (JP) ................................. 2014-225184
(Continued)

(51) Int. Cl.
| | | |
|---|---|---|
| B62D 5/04 | (2006.01) |
| F16H 1/16 | (2006.01) |
| F16H 57/00 | (2012.01) |
| F16H 57/12 | (2006.01) |
| F16H 55/56 | (2006.01) |
| F16H 57/022 | (2012.01) |
| F16C 23/08 | (2006.01) |

(Continued)

(52) U.S. Cl.
CPC ......... B62D 5/0454 (2013.01); B62D 5/0409 (2013.01); F16C 23/08 (2013.01);
(Continued)

(58) Field of Classification Search
CPC ....... B62D 5/0454; B62D 5/0409; F16H 1/16; F16H 57/0006; F16H 57/12; F16H 2057/127
See application file for complete search history.

(56) References Cited

U.S. PATENT DOCUMENTS 6,763,738 B1 * 7/2004 Tsutsui ................. B62D 5/0409
74/388 PS
7,077,235 B2 * 7/2006 Eda ...................... B62D 5/0409
180/444
(Continued)

FOREIGN PATENT DOCUMENTS

| CN | 101817363 A | 9/2010 |
| CN | 203793408 U | 8/2014 |

(Continued)

OTHER PUBLICATIONS

International Search Report (PCT/ISA/210) dated Jun. 9, 2015 issued by the International Searching Authority in counterpart International Application No. PCT/JP2015/062572.
(Continued)

Primary Examiner — Joseph M Rocca
Assistant Examiner — Michael R Stabley
(74) Attorney, Agent, or Firm — Sughrue Mion, PLLC

(57) ABSTRACT

A slide member (26) is externally fitted to an outer peripheral surface of an outer ring (20) configuring a tip side bearing (9a) for supporting a tip portion of a worm shaft (6a) so as to be displaceable in an axial direction. A first inclined cylindrical face portion (32) which is an inclined surface disposed on an outer peripheral surface of the slide member (26), and a second inclined cylindrical face portion (30) which is an inclined surface disposed on an inner peripheral surface of a guide member (28) internally fitted and fixed to a holding hole (10a) of a housing (3a) are fitted to each other so as to be slidable in an inclined direction of the respective
(Continued)

inclined cylindrical face portions (32, 30). An elastic ring (29) which biases a bearing holding member (26) against to one side in the axial direction is disposed. This realizes a structure which can shorten an axial dimension of a tip side portion of the worm shaft in an electric power steering device including biasing means for minimizing backlash in a meshing portion of a worm reduction gear.

11 Claims, 26 Drawing Sheets

(30) Foreign Application Priority Data

Dec. 25, 2014 (JP) .................................. 2014-262973
Feb. 12, 2015 (JP) .................................. 2015-025387

(51) Int. Cl.
*F16C 27/06* (2006.01)
*F16H 57/021* (2012.01)
*F16C 19/06* (2006.01)

(52) U.S. Cl.
CPC ............. *F16C 27/066* (2013.01); *F16H 1/16* (2013.01); *F16H 55/566* (2013.01); *F16H 57/0006* (2013.01); *F16H 57/022* (2013.01); *F16H 57/12* (2013.01); *F16C 19/06* (2013.01); *F16H 2057/0213* (2013.01); *F16H 2057/0222* (2013.01); *F16H 2057/127* (2013.01)

(56) References Cited

U.S. PATENT DOCUMENTS

| 7,213,677 B2* | 5/2007 | Nakamura | B62D 5/0409 180/444 |
| 7,360,467 B2* | 4/2008 | Segawa | B62D 5/0409 180/444 |
| 8,066,093 B2* | 11/2011 | Kondo | B62D 5/0409 180/443 |
| 8,684,127 B2* | 4/2014 | Hama | B62D 5/0409 180/444 |
| 2004/0149512 A1 | 8/2004 | Tsutsui et al. | |
| 2006/0169528 A1 | 8/2006 | Yuasa et al. | |

FOREIGN PATENT DOCUMENTS

| DE | 102008009107 A1 | 8/2009 | |
| DE | 102012103857 A1 | 11/2013 | |
| EP | 1671871 A1 | 6/2006 | |
| JP | 50-038204 U | 4/1975 | |
| JP | 56-085747 U | 7/1981 | |
| JP | 2002-145082 A | 5/2002 | |
| JP | 2003-014055 A | 1/2003 | |
| JP | 2003154945 A | 5/2003 | |
| JP | 2006-027321 A | 2/2006 | |
| JP | 4381024 B2 | 12/2009 | |
| JP | 2010-173375 A | 8/2010 | |
| JP | 2012-102828 A | 5/2012 | |
| WO | 2008/087748 A1 | 7/2008 | |
| WO | WO 2012/138051 | * 2/2012 | ........... B62D 5/0409 |
| WO | 2012138051 A1 | 10/2012 | |

OTHER PUBLICATIONS

Written Opinion (PCT/ISA/237) dated Jun. 9, 2015 issued by the International Searching Authority in counterpart International Application No. PCT/JP2015/062572.
Communication dated Oct. 10, 2017, from the European Patent Office in counterpart European Application No. 15845128.6.
Office Action dated Jul. 16, 2018 by the State Intellectual Property Office of P.R. China in counterpart Chinese Patent Application No. 201580046694.5.

* cited by examiner

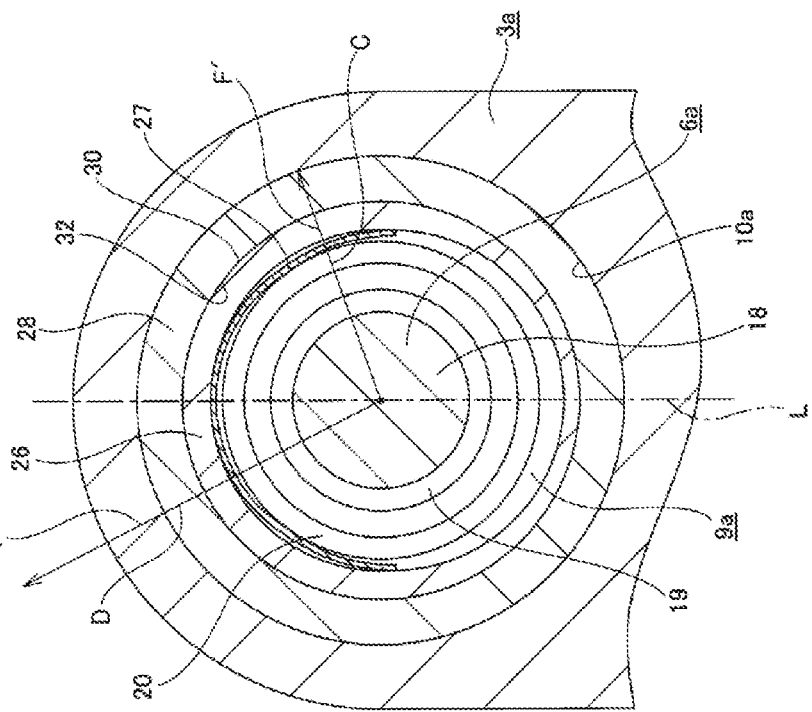
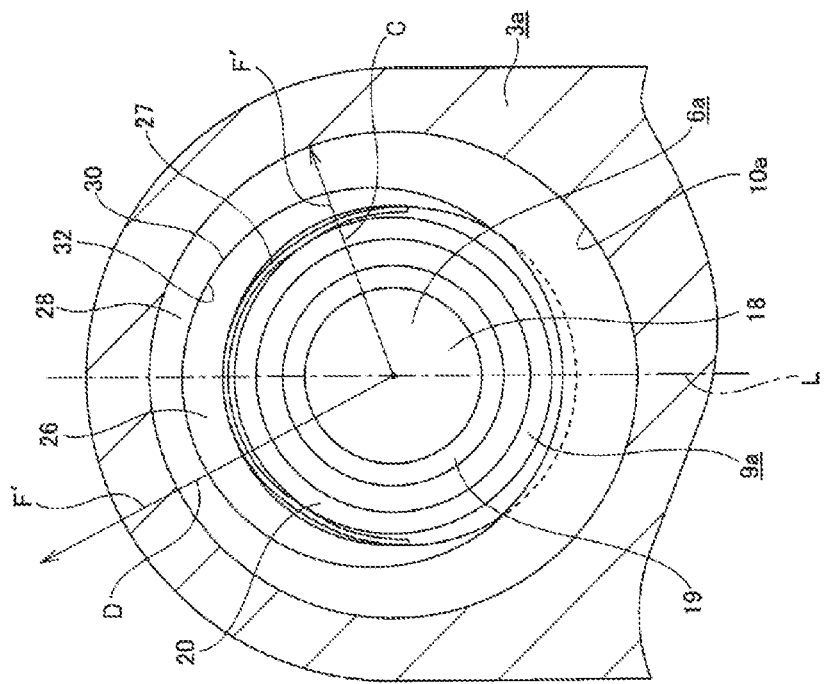

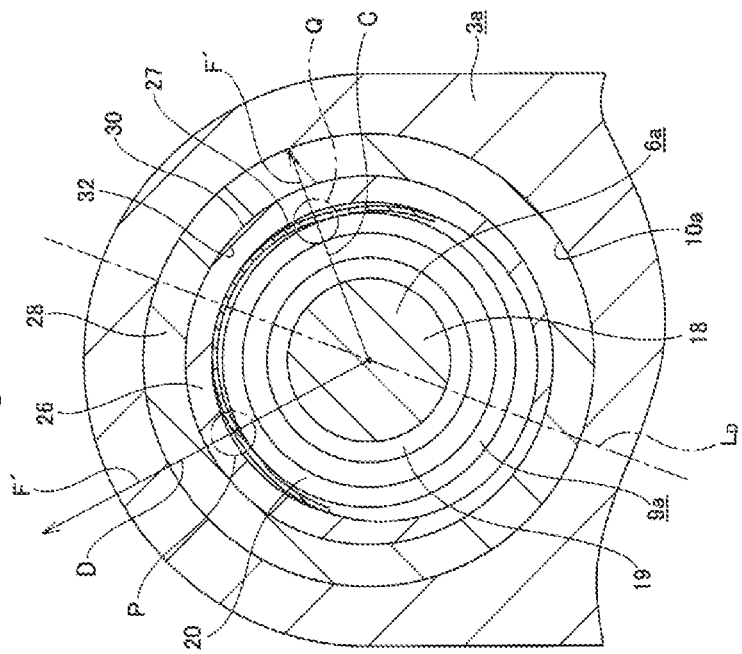
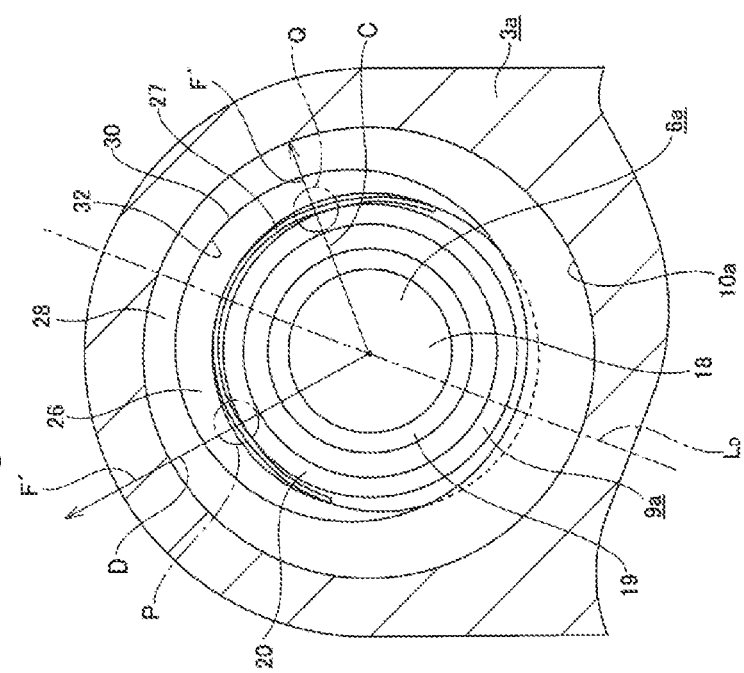

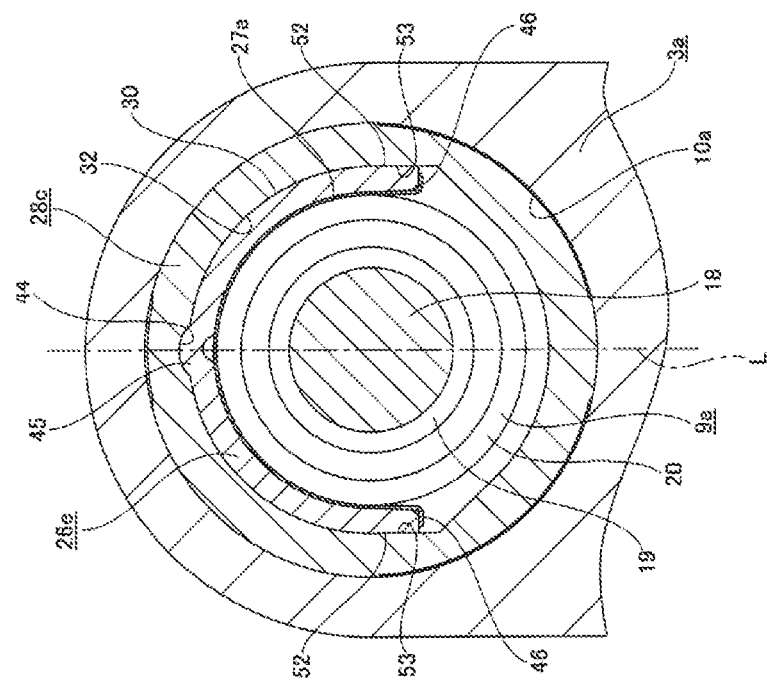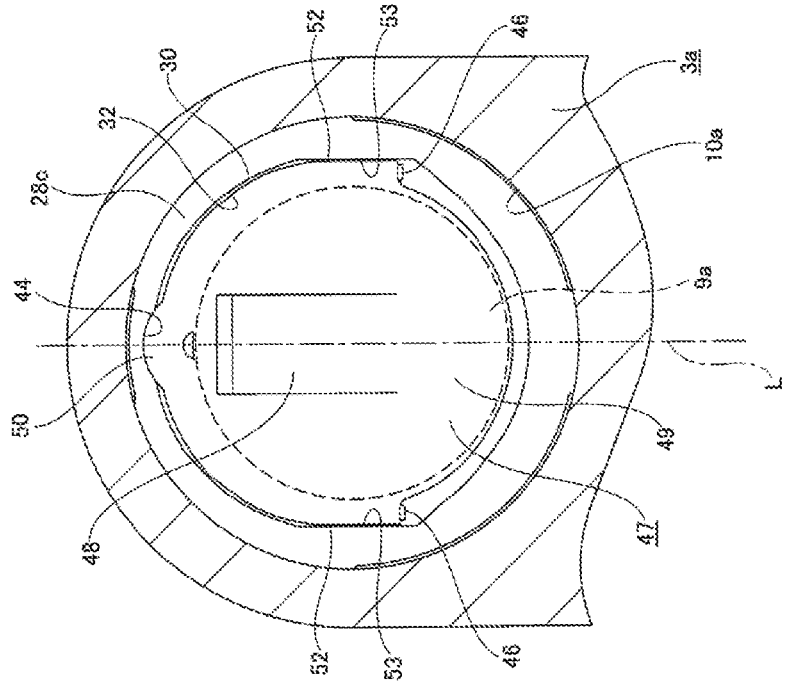

ELECTRIC POWER STEERING DEVICE

TECHNICAL FIELD

The present invention relates to an electric power steering device, and particularly relates to an electric power steering device which is used as a steering device for automobiles and which uses an electric motor as an auxiliary power unit so as to reduce power required for a driver to operate a steering wheel. The present invention relates to a technique for miniaturizing a worm reduction gear incorporated in this electric power steering device.

BACKGROUND ART

A power steering device has been widely used as a device for reducing power required for a driver to operate a steering wheel when the driver gives a steering angle to a steering wheel (excluding special vehicles such as forklifts, normally a front wheel). In addition, as this steering device, an electric power steering device which uses an electric motor as an auxiliary power unit has come into use in recent years. Compared to a hydraulic power steering device, the electric power steering device can adopt a miniaturized and light-weight configuration, thereby providing advantages in that not only is a magnitude (torque) of auxiliary power easily controlled but also an engine is subjected to energy loss less.

Various strictures are known in the electric power steering device. In a case of any structure, the auxiliary power of the electric motor is transmitted via a reduction gear to a steering shaft rotated by the operation of the steering wheel, or to a member (a pinion shaft or rack shaft which configures a steering gear unit) which is displaced in response to the rotation of the steering shaft. As this reduction gear, a worm reduction gear is generally used. In a case of the electric power steering device using the worm reduction gear, the auxiliary power of the electric motor is freely transmitted to a rotary shaft which is an output unit of the worm reduction gear in such a way that a worm rotatably driven by the electric motor meshes with a worm wheel rotating with the rotary shaft.

For example, Patent Document 1 discloses an electric power steering device as illustrated in FIGS. 22 and 23. In the electric power steering device, a front end portion of a steering shaft 2 serving as a rotary shaft, which is rotated in a predetermined direction by a steering wheel 1, is rotatably supported inside a housing 3, and a worm wheel 4 is fixed to the front end portion of the steering shaft 2. In addition, in a state where a worm gear 5 disposed in an axially intermediate portion of a worm shaft 6 rotatably driven by an electric motor 7 meshes with the worm wheel 4, a base portion of the worm shaft 6 is rotatably supported by a base side bearing 8, and similarly a tip portion thereof is rotatably supported by a tip side hearing 9 inside the housing 3, respectively.

In the worm reduction gear including the worm wheel 4 and the worm gear 5 which mesh with each other, inevitable backlash is usually present in a meshing portion between the worm wheel 4 and the worm gear 5. The backlash occurs not only due to a dimensional error or an assembling error of each member configuring the worm reduction gear, but also due to abrasion on a tooth surface between the worm wheel 4 and the worm gear 5. In particular, in recent years, the auxiliary power tends to increase. Consequently, the abrasion amount increases, and thus the backlash is likely to occur. In any case, if the backlash is present in the meshing portion, when a rotation direction of the steering shaft 2 is changed or when rotational vibrations are applied from a wheel side to the steering shaft 2, there is a possibility that harsh gear rattling noise may be generated in the meshing portion.

Therefore, in a case of the illustrated structure, in order to minimize the backlash in the meshing portion between the worm wheel 4 and the worm gear 5, the worm shaft 6 is caused to oscillate around the base side bearing 8 so that the worm gear 5 is biased toward the worm wheel 4.

For this reason, in the case of the illustrated structure, a holding recess 10 is disposed in a peripheral portion of a tip portion of the worm shaft 6 inside the housing 3, and a holder 11 is held and fixed inside the holding recess 10. In addition, an outer ring configuring the tip side bearing 9 is internally fitted and fixed to the holder 11, and an annular bush 12 made of an elastic material is internally fitted and fixed to an inner ring configuring the tip side bearing 9. Then, a tip side portion of the worm shaft 6 is loosely inserted into the bush 12. In this manner, the tip side portion of the worm shaft 6 is supported by the holder 11 so as to be rotatable and movable close to or away from the worm wheel 4. In addition, a preload pad 13 is disposed in a portion adjacent to an axially outer side (right side in FIG. 23) of the holder 11 inside the holding recess 10 so as to enable displacement in a meshing direction (vertical direction in FIG. 23) between the worm wheel 4 and the worm gear 5. Concurrently, a tip portion of the worm shaft 6 is inserted into a through-hole disposed in a central portion of the preload pad 13 so as to be rotatable relative to the preload pad 13 without any rattling in a radial direction. Then, resilience of a coil spring 14 installed between the preload pad 13 and the holder 11 presses the tip portion of the worm shaft 6 toward the worm wheel 4 via the preload pad 13. This causes the worm shaft 6 to oscillate around the base side bearing 8. In this manner, the worm gear 5 is biased toward the worm wheel 4, thereby minimizing the backlash in the meshing portion between the worm gear 5 and the worm wheel 4, and suppressing the occurrence of the gear rattling noise in the meshing portion.

A meshing reaction force applied to the worm shaft 6 from the meshing portion between the worm wheel 4 and the worm gear 5 includes not only a component in the meshing direction (vertical direction in FIG. 23) but also a component in directions (forward and rearward directions in FIG. 23) respectively perpendicular to the meshing direction and the axial direction of the worm shaft 6. Hereinafter, this point will be described with reference to FIGS. 24 to 26.

As illustrated in FIGS. 24 and 25, if a driving force is transmitted from the worm shaft 6 to the worm wheel 4 by driving the worm shaft 6 rotatably, the meshing reaction force is applied from the worm wheel 4 to the worm shaft 6. In a case illustrated in FIG. 24 and in a case illustrated in FIG. 25, the driving forces applied to the worm shaft 6 have the same magnitude as each other. However, rotation directions of the driving forces are opposite to each other. Therefore, the worm wheels 4 in the case illustrated in FIG. 24 and in the case illustrated in FIG. 25 rotate in the directions opposite to each other. In this state, in the meshing portion between the worm wheel 4 and the worm gear 5, the apparent meshing reaction force having component forces $F_x$, $F_y$, and $F_z$ which are respectively components in three directions x, y, and z in FIGS. 24 and 25 is applied from the worm wheel 4 to the worm shaft 6. Among these component forces $F_x$, $F_y$, and $F_z$, the component forces $F_x$ and $F_z$ are applied in the directions opposite to each other in a case where the worm wheel 4 rotates in one direction {a direction illustrated by an arrow A in FIG. 24(A)} as illustrated in FIG. 24 and in a case where the worm wheel 4 rotates in the other direction {a direction illustrated by an arrow B in FIG. 25(A)} as illustrated in FIG. 25.

On the other hand, when a distance between the meshing portion and an oscillation center o of the worm shaft 6 in the radiation direction of the worm shaft 6 is set to $d_6$, a moment M having a magnitude of $d_6 \cdot F_x$ is applied to the worm shaft 6. Therefore, when a distance between the meshing portion and the oscillation center o in the axial direction of the worm shaft 6 is set to $L_6$, a force $F_r$ having a magnitude of $M/L_6$ based on the moment M is applied in the radial direction (upward direction in FIG. 24, downward direction in FIG. 25) of the worm shaft 6. The forces $F_r$ are applied in the directions opposite to each other in a case illustrated in FIG. 24 and in a case illustrated in FIG. 25. Therefore, a magnitude of an actual force $F_y'$ in the direction y which is applied from the worm wheel 4 to the worm shaft 6 in the meshing portion and which considers the moment M decreases (becomes $F_y'=F_y-F_r$) when the worm wheel 4 rotates in one direction as illustrated in FIG. 24, and increases (becomes $F_y'=F_y+F_r$) when the worm wheel 4 rotates in the other direction as illustrated in FIG. 25. Accordingly, a resultant force F' of the actual meshing component forces applied to the mashing portion in the directions y and z decreases as illustrated by an arrow C in FIG. 26 when the worm wheel 4 rotates in one direction, and increases as illustrated by an arrow D in FIG. 26 when the worm wheel 4 rotates in the other direction. Then, as is understood from the direction of the resultant force F', even when the worm wheel 4 rotates in any direction, the meshing reaction force applied from the meshing portion to the worm shaft 6 includes components in the meshing direction (vertical direction in FIGS. 24 to 26) between the worm wheel 4 and the worm gear 5, and the directions {forward and rearward directions in FIGS. 24(A) and 25(A), rightward and leftward directions in FIGS. 24(B), 25(B), and 26} perpendicular to the axial direction of the worm shaft 6.

In a case of the above-described electric power steering device in the related art, the worm shaft 6 has a portion for externally fitting the preload pad 13 on a further tip side from a portion supported by the tip side bearing 9. Therefore, an axial dimension of the tip side portion of the worm shaft 6 increases correspondingly. Consequently, the worm reduction gear configured to include the worm shall 6 is less likely to be miniaturized.

PRIOR ART DOCUMENT

Patent Document

Patent Document 1: Japanese Patent No. 4381024

SUMMARY OF THE INVENTION

Problem to be Solved

In view of the above-described circumstances, the present invention is made in order to realize a structure which can shorten an axial dimension of a tip side portion of a worm shaft in an electric power steering device including biasing means for minimizing backlash of a meshing portion between a worm wheel and a worm gear.

Means for Solving the Problem

An electric power steering device according to the present invention includes a housing, a rotary shaft that is rotatably disposed in the housing, a worm wheel that is supported concentrically with the rotary shaft inside the housing, and that rotates with the rotary shaft, a worm shaft that has a worm gear in an axially intermediate portion, and that causes the worm gear to mesh with the worm wheel, a base side bearing that supports a base portion of the worm shaft so as to be rotatable in the housing, a tip side bearing that supports a tip portion of the worm shaft so as to be rotatable in the housing, an electric motor whose tip portion of an output shaft engages with the base portion of the worm shaft so that a rotating force can be transmitted, and biasing means for biasing the worm gear toward the worm wheel by biasing the tip portion of the worm shaft against the worm wheel side and causing the worm shaft to oscillate.

For example, as the rotary shaft, it is possible to employ a steering shaft 2 having the above-described structure illustrated in FIG. 22, an intermediate shaft 15, an input shaft (pinion shaft) 17 of a steering gear unit 16, and further an assisting pinion shaft disposed separate from the input shaft.

In addition, the biasing means biases the worm gear toward the worm wheel by biasing the tip portion of the worm shaft against the worm wheel side {in a radial direction (for example, a meshing direction between the worm gear and the worm wheel, or a direction of a bisector to be described later)}, and by causing the worm shaft to oscillate around a base portion (for example, the base side bearing) or an intermediate portion of the worm shaft.

In particular, in a case of the electric power steering device according to the present invention, the tip side bearing is externally fitted to and supported by the tip portion of the worm shaft.

In addition, the biasing means includes a slide member that is disposed so as to be displaceable (movable close to or away from the base side bearing) in a longitudinal direction (including not only a direction exactly coincident with the axial direction but also an inclined direction with respect to the axial direction) of the worm shaft between an outer peripheral surface of the tip side bearing and an inner peripheral surface of the housing, and that has a first inclined cylindrical face portion which is inclined to a central axis of the tip side bearing on any one peripheral surface of the outer peripheral surface and the inner peripheral surface, a second inclined cylindrical face portion that is disposed with respect to the housing or the tip side bearing in a state where displacement in the longitudinal direction of the worm shaft is hindered, and that is fitted to the first inclined cylindrical face portion, and a biasing member that biases the slide member toward a base side (base side bearing side) of the worm shaft in the longitudinal direction of the worm shaft.

Then, the biasing means biases the tip portion of the worm shaft against the worm wheel side (in the radial direction), in response to an operation in which the biasing member biases the slide member toward the base side bearing, based on an operation in which the slide member or a member having the second inclined cylindrical face portion is displaced to the worm wheel side (in the radial direction).

The respective first and second inclined cylindrical face portions are not necessarily those which are respectively whole-circumferentially linked (annularly cylindrical surface portions), and may be those which are present in only one portion in the circumferential direction (partially cylindrical surface portions).

When the electric power steering device according to the present invention as described above is embodied, the slide member may have the first inclined cylindrical face portion on the outer peripheral surface. The second inclined cylindrical face portion may be formed on an inner peripheral surface of a guide member internally fitted to the housing, or may be formed integrally with the housing.

When this configuration is embodied, preferably, in any one fitting portion of a fitting portion between the outer peripheral surface of the tip side bearing and the inner peripheral surface of the slide member, a fitting portion between the first inclined cylindrical face portion and the second inclined cylindrical face portion, and a fitting portion between the outer peripheral surface of the guide member and the inner peripheral surface of the housing, an adjusting elastic member which applies resilience directed toward the worm wheel side to a member present on an inner diameter side of the fitting portion is held.

In addition, when the electric power steering device according to the present invention is embodied, the slide member may have the first inclined cylindrical face portion on the inner peripheral surface. The second inclined cylindrical face portion may be formed on an outer peripheral surface of a guide member externally fitted to the tip side bearing, or may be formed integrally with an outer peripheral portion of the tip side bearing.

When this configuration is embodied, preferably, in any one fitting portion of a fitting portion between the first inclined cylindrical face portion and the second inclined cylindrical face portion and a fitting portion between the outer peripheral surface of the slide member and the inner peripheral surface of the housing, an adjusting elastic member which applies resilience directed toward the worm wheel side to a member present on an inner diameter side of the fitting portion is held.

In addition, when the present invention is embodied, preferably, the biasing means biases the tip portion of the worm shaft toward the worm wheel in a direction of a bisector between a vector of a component force (component force F' illustrated by one arrow of an arrow C and an arrow D in FIG. 26) inside a virtual plane orthogonal to the worm shaft of a meshing reaction force applied to the worm shaft from the meshing portion between the worm wheel and the worm gear when a steering wheel is rotated to one side in rightward and leftward directions (the worm shaft, the worm wheel, and the rotary shaft are respectively rotated to one side), and a vector of a component force (component force F' illustrated by the other arrow of the arrow C and the arrow D in FIG. 26) inside a virtual plane orthogonal to the worm shaft of a meshing reaction force applied to the worm shaft from the meshing portion when the steering wheel is rotated to the other side in the rightward and leftward directions (the worm shaft, the worm wheel, and the rotary shaft are respectively rotated to the other side).

In addition, when the present invention is embodied, the slide member may be made in a partially cylindrical shape, for example.

Alternatively, the slide member may include multiple split elements which are arranged apart from each other in a circumferential direction (for example, which respectively have a partially cylindrical shape).

In addition, in these cases, a configuration may be adopted in which the biasing member biases the slide member toward the base side of the worm shaft via the plate-shaped member in a state where an outer peripheral portion on a side face of a single plate-shaped member is brought into contact with an end face opposite to the base side of the worm shaft among both end faces of the slide member (or the respective split elements) in the axial direction.

Furthermore, the above-described configuration may further include a cap that closes an outer end opening of the inner peripheral surface of the housing. A configuration may be adopted in which the biasing member is in contact with an inner surface of a bottom plate portion of the cap, and in which a contact portion where an end face of the slide member which is opposite to the base side of the worm shaft is in contact with an outer peripheral portion of the side face of the plate-shaped member, and a contact portion where the biasing member is in contact with the inner surface of the bottom plate portion of the cap are deviated from each other in the longitudinal direction of the worm shaft.

In addition, when the present invention is embodied, the slide member may be made in a whole-circumferentially linked annular shape. The first inclined cylindrical face portion may be formed in only a portion in the circumferential direction on a peripheral surface of the slide member.

In addition, when the present invention is embodied, a member for funning the second inclined cylindrical face portion may be made in a whole-circumferentially linked annular shape. The second inclined cylindrical face portion may be formed in only a portion in the circumferential direction on a peripheral surface of the member.

In addition, when the present invention is embodied, one portion on a peripheral surface on a side having the first inclined cylindrical face portion of the slide member, and one portion on a peripheral surface on a side having the second inclined cylindrical face portion of a member having the second inclined cylindrical face portion may mechanically engage with each other (for example, an engagement recess and an engagement projection which are formed in the respective portions engage with each other, or planar portions formed in the respective portions are brought into contact with each other) so as to prevent relative rotation between the slide member and the member having the second inclined cylindrical face portion.

Effects of Invention

In a case of an electric power steering device according to the present invention configured as described above, a fitting portion between first and second inclined cylindrical face portions configuring biasing means is disposed on an outside diameter side of a tip side bearing. Based on displacement in a longitudinal direction of a worm shaft of a slide member having the first inclined cylindrical face portion, a lip side bearing is biased against a worm wheel side. Accordingly, a tip side portion of the worm shaft does not need a portion which is further extended to the tip side from a portion supported by the tip side bearing. Therefore, an axial dimension of the tip side portion of the worm shaft can be shortened correspondingly. As a result, it is possible to easily miniaturize a worm reduction gear configured to include the worm shaft.

BRIEF DESCRIPTION OF DRAWINGS

FIG. 3A is a sectional view taken along line III-III in FIG. 2, and FIG. 3B is a sectional view taken along line III'-III' in FIG. 2.

FIG. 12A is a sectional view taken along line XII-XII in FIG. 10, and FIG. 12B is a sectional view taken along line in FIG. 10.

FIG. 14A is a sectional view taken along line XIV-XIV in FIG. 13, and FIG. 14B is a sectional view taken along line XIV'-XIV' in FIG. 13.

DESCRIPTION OF EMBODIMENTS

First Embodiment

A first embodiment according to the present invention will be described with reference to FIGS. 1 to 4.

Figure 22:
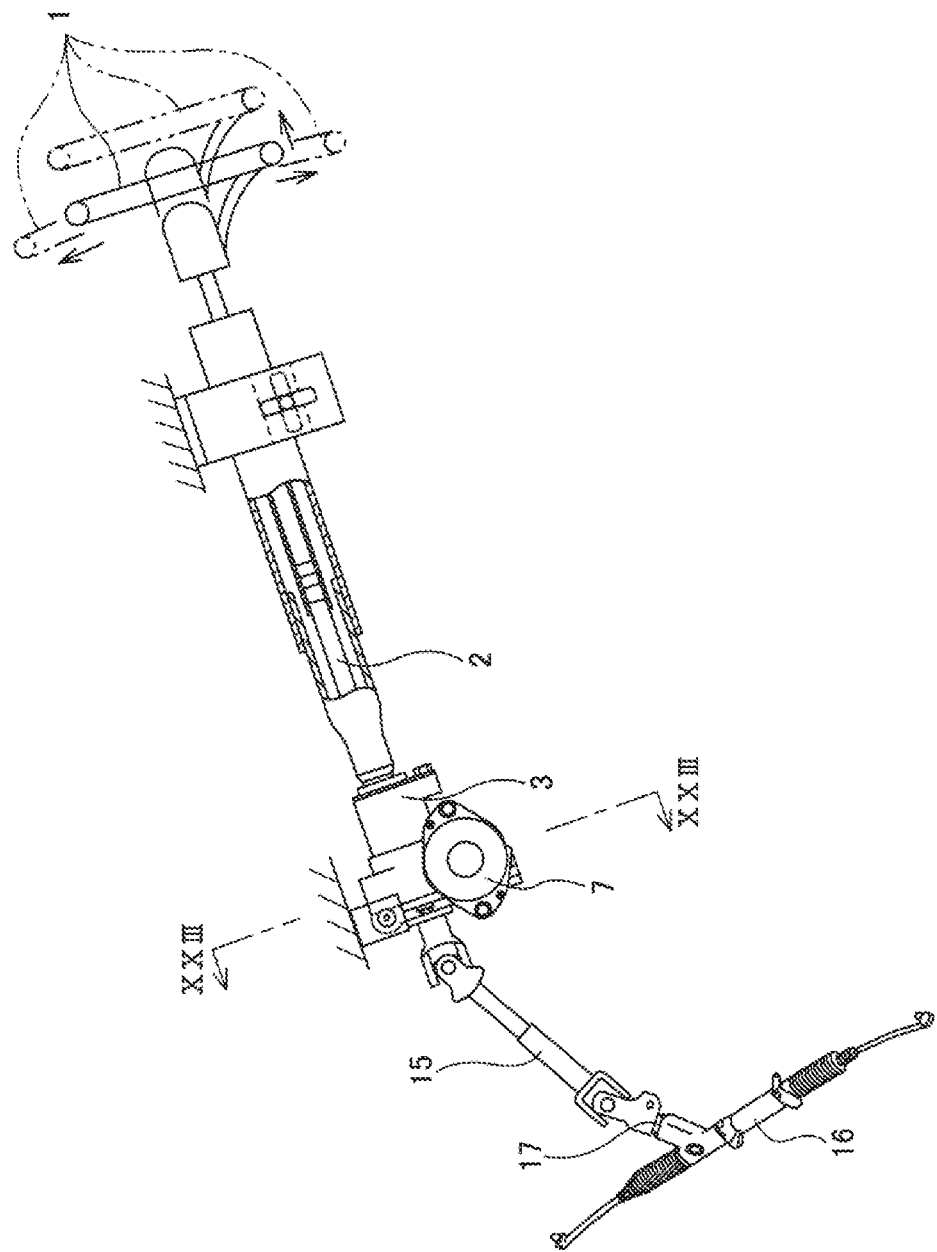
FIG. 22 is a partially cut side view illustrating one example of a steering device having a structure in the related art.
Figure 23:
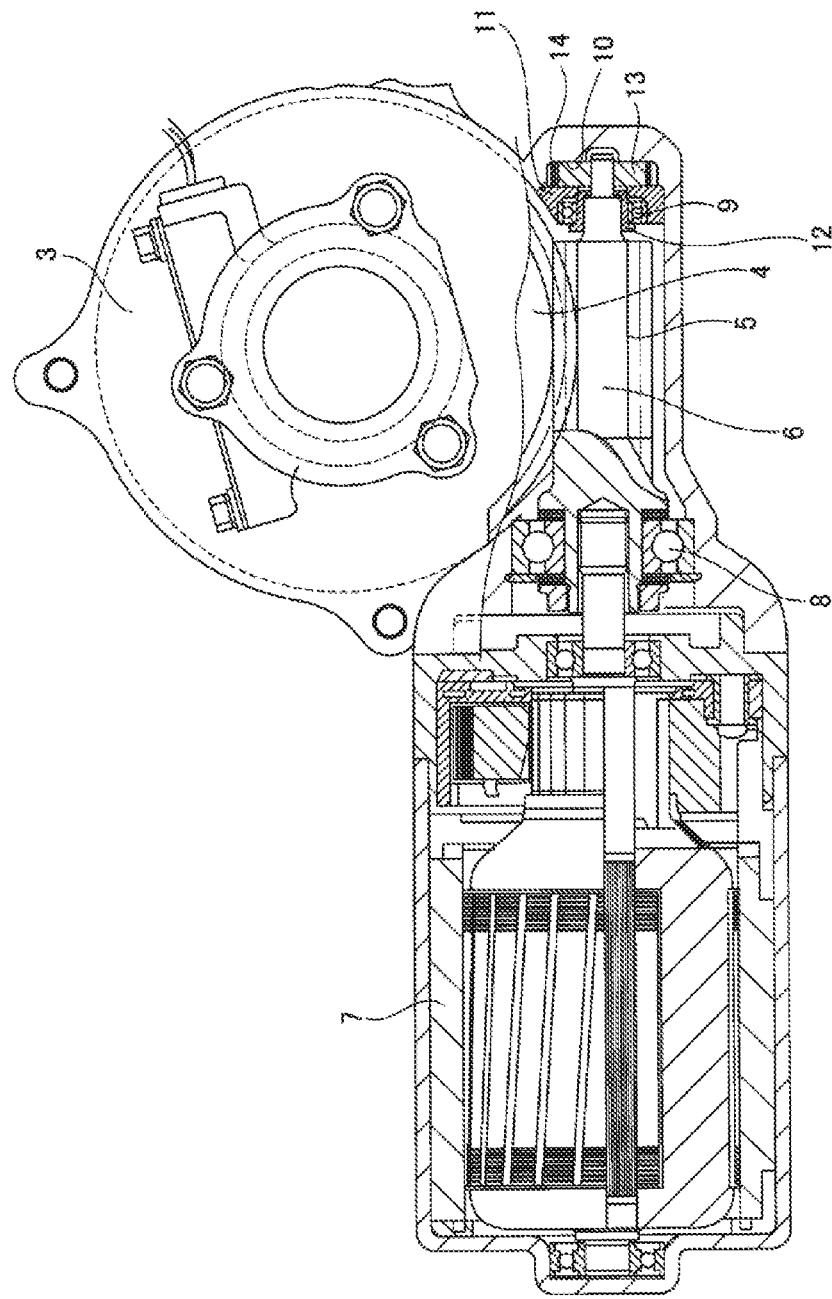
FIG. 23 is an enlarged sectional view taken along line XXIII-XXIII in FIG. 22.
Figure 24B:
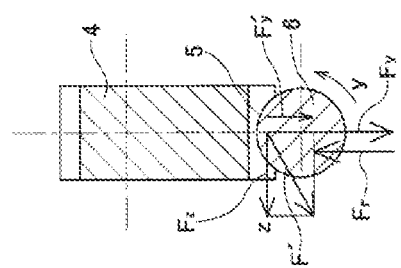
FIG. 24B is a sectional view taken along line XXIV-XXIV in FIG. 24A.
Figure 24A:
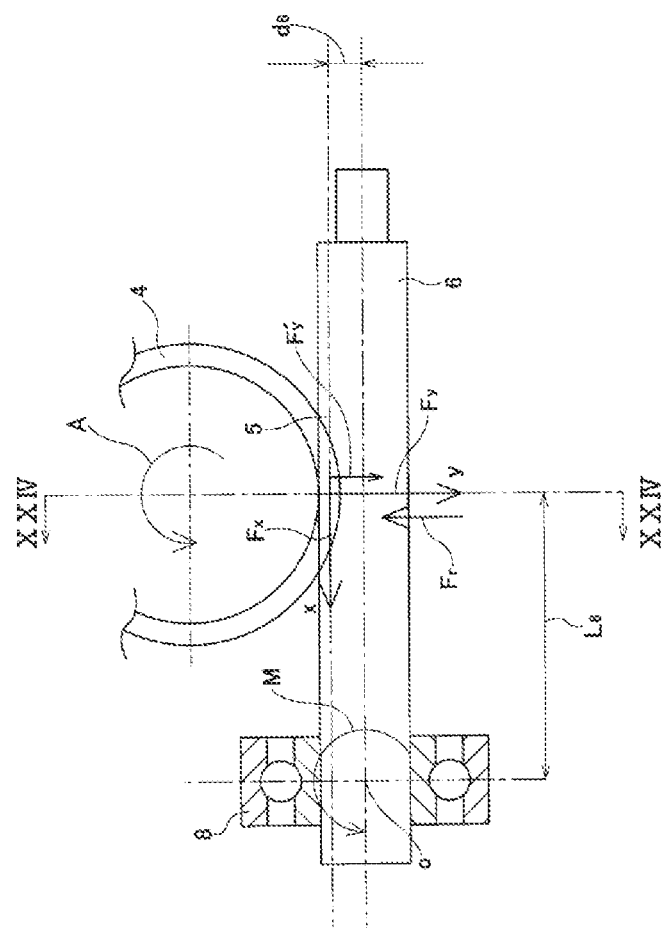
FIG. 24A is a schematic sectional view for describing a direction of a meshing reaction force applied from a worm wheel to a worm shaft when an electric motor is rotatable driven in a predetermined direction.
Figure 25A:
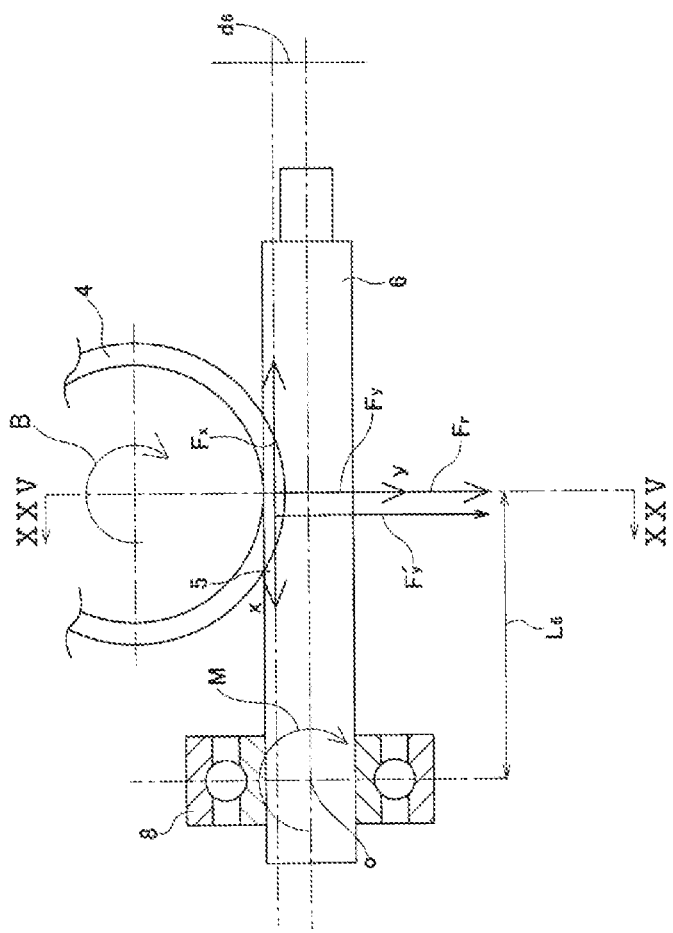
FIG. 25A is a schematic sectional view for describing a direction of the meshing reaction force applied from the worm wheel to the worm shaft when the electric motor is rotatably driven in a direction opposite to the predetermined direction.
Figure 25B:
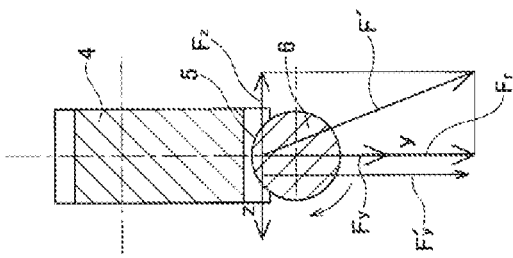
FIG. 25B is a sectional view taken along line XXV-XXV in FIG. 25A.

One characteristic point of an electric power steering device according to the present embodiment is to study a structure of biasing means for biasing a tip portion of a worm shaft 6a against a worm wheel 4 side in a meshing direction between a worm gear 5 and a worm wheel 4. A structure and operation of other portions are substantially the same as the structure in the related art illustrated in FIGS. 22 and 23 described above. Thus, illustration and description with regard to equivalent portions will be omitted or simplified. Hereinafter, a characteristic part according to the present embodiment will be mainly described. In FIG. 23 described above and in FIG. 1 according to the present embodiment, directions in which an electric motor 7 is attached to a housing 3a are different from each other. However, this point may be appropriately changed in design depending on an installing-target automobile, and has no relationship with the characteristic part according to the present invention.

According to the present embodiment, the worm shaft 6a also has a worm gear 5 in an axially intermediate portion. In a state where the worm gear 5 meshes with the worm wheel 4, a base portion on a side close to an electric motor 7 among both end portions in an axial direction of the worm shaft 6a is rotatably supported by a base side bearing 8a which is a ball bearing of a single row deep groove type or four-point contact type, and similarly a tip portion on a side far from the electric motor 7 is rotatably supported by a tip side bearing 9a which is a ball bearing of a single row deep groove type, inside a housing 3a, respectively. In addition, the base side bearing 8a supports the worm shaft 6a so as to be capable of slight oscillation and displacement inside the housing 3a.

On the other hand, the tip side bearing 9a is externally fitted to and supported by a small diameter portion 18 disposed in a tip portion of the worm shaft 6a. Therefore, in a case of the present embodiment, an inner ring 19 configuring the tip side bearing 9a is externally fitted and fixed to the small diameter portion 18 by means of interference fit. In addition, a peripheral portion of the tip side bearing 9a inside the housing 3a has a holding recess 10a which has a larger diameter than a cylindrical outer peripheral surface of an outer ring 20 configuring the tip side bearing 9a and which has a cylindrical inner peripheral surface. An outer end portion (left end portion in FIGS. 1 and 2) in the axial direction of the holding recess 10a is open outward from the housing 3a. Then, the outer end opening of the holding recess 10a is closed by a cap 21 made of a metal plate in a bottomed cylindrical shape. The cap 21 is made of the metal plate, and includes a cylindrical fitting cylinder portion 22, a disc-shaped bottom plate portion 23 for closing an inner end (right end in FIGS. 1 and 2) opening in the axial direction of the fitting cylinder portion 22, and an annular outward flange portion 24 disposed in an outer end portion in the axial direction of the fitting cylinder portion 22. The fitting cylinder portion 22 is internally fitted to an axially outer end portion of the holding recess 10a by means of press fit (interference fit). An inner surface of the outward flange portion 24 abuts against a peripheral portion of the opening portion of the holding recess 10a of an outer surface of the housing 3a. In this manner, the cap 21 is assembled to the opening portion of the holding recess 10a in a state where the cap 21 is positioned in the axial direction.

In addition, biasing means 25 is assembled to the peripheral portion of the tip side bearing 9a inside the holding recess 10a. Then, the biasing means 25 biases the tip portion of the worm shaft 6a against the worm wheel 4 side (lower side in FIGS. 1 to 3) via the tip side bearing 9a in a meshing direction between the worm wheel 4 and the worm gear 5 (vertical direction in FIGS. 1 to 3, direction of a straight line L in FIG. 3). In this manner, the worm shaft 6a is caused to oscillate around the base side bearing 8a so that the worm gear 5 is biased toward the worm wheel 4.

This biasing means 25 includes a slide member 26, a leaf spring 27, a guide member 28, and an elastic ring 29. In a case of the present embodiment, the elastic ring 29 corresponds to a biasing member according to the present invention, and the leaf spring 27 corresponds to an adjusting elastic member according to the present invention.

The slide member 26 is made of metal such as an iron-based alloy and an aluminum alloy or a synthetic resin, and is formed into a substantially cylindrical shape. The slide member 26 is externally fitted to the outer peripheral surface of the outer ring 20 so as to be capable of axial displacement {displacement in a longitudinal direction (axial direction) of the worm shaft 6} relative to the outer ring 20 via the leaf spring 27. A central axis of the inner peripheral surface of the slide member 26 is coincident with or parallel to a central axis of the tip side bearing 9a. Description will be made later with regard to a specific shape of the inner peripheral surface of this slide member 26 and a specific shape and installation form of the leaf spring 27. On the other hand, the outer peripheral surface of the slide member 26 serves as a first inclined cylindrical face portion 30 which is inclined at a predetermined angle θ (5 degrees to 15 degrees) to the central axis of the tip side bearing 9a inside a virtual plane orthogonal to the central axis of the worm wheel 4, in a direction toward the worm wheel 4 side (lower side in FIGS. 1 and 2) as it goes toward the base side bearing 8a side (right side in FIGS. 1 and 2) in the axial direction.

In addition, the guide member 28 is made of metal such as an iron-based alloy and an aluminum alloy or a synthetic resin, and is formed into a substantially cylindrical shape. This guide member 28 is internally fitted and fixed to the holding recess 10a by means of press fit (interference fit) in a state where the guide member 28 is arranged at a position for surrounding the outer periphery of the slide member 26. In addition, in this state, axial positioning and retaining (preventing axial displacement) of the guide member 28 are achieved in such a way that the guide member 28 is held in the axial direction between a stepped surface 31 present in an axially back end portion of the holding recess 10a and an inner surface of the bottom plate portion 23 configuring the cap 21. That is, in a case of the present embodiment, the guide member 28 is not displaced in the longitudinal direction (axial direction) of the worm shaft 6a. In addition, positioning in a circumferential direction of the guide member 28 is achieved in such a way that multiple engagement recesses (not illustrated) formed in a circumferential direction 1 or in the axial direction of the inner peripheral surface of the holding recess 10a and multiple engagement recesses (not illustrated) formed in the circumferential direction 1 or in the axial direction of the outer peripheral surface of the guide member 28 are caused to engage with each other. The inner peripheral surface of this guide member 28 serves as a cylindrical second inclined cylindrical face portion 32 which is inclined in the same direction and at the same angle as those of the first inclined cylindrical face portion 30 and which is coincident with the first inclined cylindrical face portion 30. Then, the first inclined cylindrical face portion 30 is internally fitted to the second inclined cylindrical face portion 32 without any rattling in the radial direction so as to be slidable in an inclined direction of the second inclined cylindrical face portion 32 (so as to be displaceable in a direction parallel to a bus line of the second inclined cylindrical face portion 32).

Figure 1:
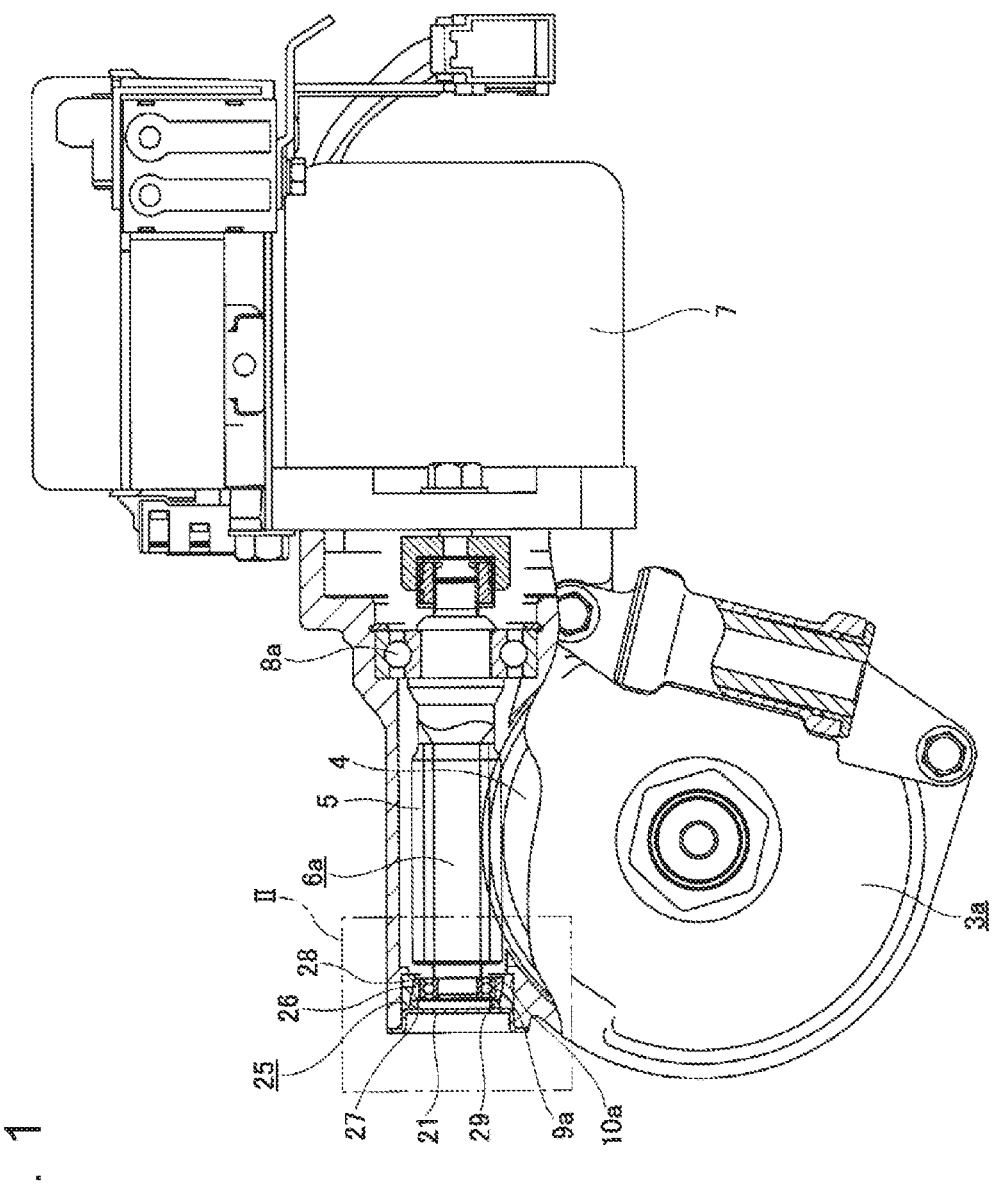
FIG. 1 illustrates a first embodiment according to the present invention, and is a view corresponding to an enlarged sectional view taken along line XXIII-XXIII in FIG. 22.
Figure 2:
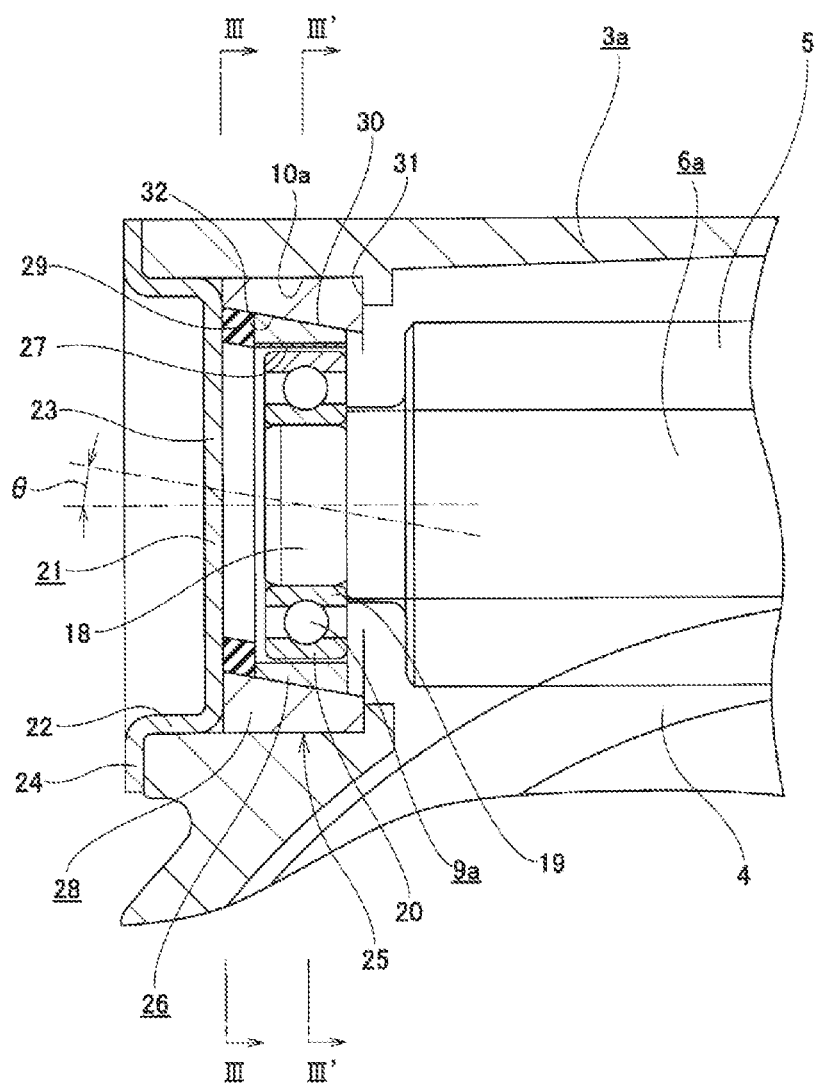
FIG. 2 is an enlarged view of a portion II in FIG. 1.

In a case of the present embodiment, if the slide member 26 tends to be displaced to the base side bearing 8a side (to the base side of the worm shaft 6a in the longitudinal direction of the worm shaft 6a) along the second inclined cylindrical face portion 32, in response to this displacement, the slide member 26 tends to be displaced to the worm wheel 4 side (lower side in FIGS. 1 and 2) in the vertical direction in FIGS. 1 to 3 which is the meshing direction between the worm wheel 4 and the worm gear 5. The tip portion of the tip side bearing 9a and the worm shaft 6a which are present on the inner diameter side of the slide member 26 also tends to be displaced to the worm wheel 4 side. As a result, the worm shaft 6a oscillates around the base side bearing 8a. In this manner, the worm gear 5 tends to be displaced to the worm wheel 4 side.

In addition, the elastic ring 29 is made of elastomers such as rubber and is formed into an annular shape having a substantially rectangular cross section. The elastic ring 29 is elastically compressed and held between an axially outer surface of the slide member 26 and an inner surface of the bottom plate portion 23 of the cap 21. Then, in a case of the present embodiment, resilience of the elastic ring 29 biases the slide member 26 against the base side bearing 8a side (side closer to the worm wheel 4 in the inclined direction of the first inclined cylindrical face portion 30) along the second inclined cylindrical face portion 32. Then, based on the biasing, the slide member 26 biases the tip portion of the worm shaft 6a against the worm wheel 4 side via the leaf spring 27 and the tip side bearing 9a in the vertical direction in FIGS. 1 to 3 (direction of a straight line L in FIG. 3). This causes the worm shaft 6a to oscillate around the base side bearing 8a, thereby biasing the worm gear 5 toward the worm wheel 4.

In addition, in a case of the present embodiment, a cross-sectional shape of the inner peripheral surface of the slide member 26 is an oval shape extending in the meshing direction (vertical direction in FIGS. 1 to 3, direction of the straight line L in FIG. 3) between the worm wheel 4 and the worm gear 5. In addition, in the cross-sectional shape of the inner peripheral surface of the slide member 26, the radius of curvature of a semicircular arc shape which is a shape of both end portions in the meshing direction is greater than the radius of curvature (diameter/2) of the outer peripheral surface of the outer ring 20 of the tip side bearing 9a.

In addition, the leaf spring 27 has a semi-cylindrical shape. As illustrated in FIG. 3, the leaf spring 27 is assembled to the half on an opposite side (upper side in FIGS. 1 to 3) to the worm wheel 4 in the meshing direction, in a section between the outer peripheral surface of the outer ring 20 and the inner peripheral portion of the slide member 26. In the illustrated assembled state, the outer peripheral surface of the outer ring 20 is not in direct contact with the inner peripheral surface of the slide member 26, and is in contact with the inner peripheral surface of the slide member 26 only via the leaf spring 27. In addition, in the illustrated assembled state, the outer peripheral surface of the leaf spring 27 is in contact with the inner peripheral surface of the slide member 26 at only three locations of the central portion and both end portions in the longitudinal direction of the leaf spring 27. In addition, similarly, the inner peripheral surface of the leaf spring 27 is in contact with the outer peripheral surface of the outer ring 20 at only two locations close to both ends in the longitudinal direction of the leaf spring 27. Then, in this state, the slide member 26 is in a state where the slide member 26 is externally fitted to the outer ring 20 by the resilience of the leaf spring 27 without any rattling in directions respectively perpendicular to the meshing direction and the axial direction of the worm shaft 6a (rightward and leftward directions in FIG. 3).

Figure 4A:
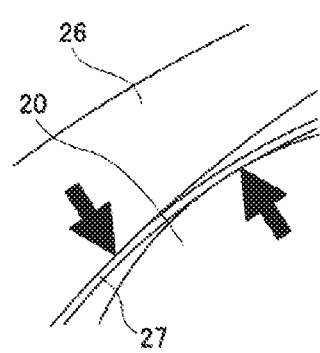
FIG. 4A is an enlarged view illustrating a state where a meshing reaction force is not applied to a portion where an outer peripheral surface of an outer ring and an inner peripheral surface of a slide member are brought into contact with each other via a leaf spring.
Figure 4B:
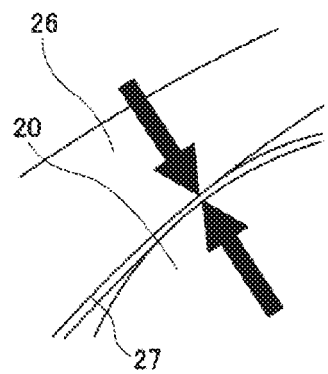
FIG. 4B is an enlarged view illustrating a state where the meshing reaction force is applied to the portion where the outer peripheral surface of the outer ring and the inner peripheral surface of the slide member are brought into contact with each other via the leaf spring.

In addition, in a case of the present embodiment, in a state where a meshing reaction force is not applied to the worm shaft 6a from at least the meshing portion between the worm wheel 4 and the worm gear 5, as illustrated in FIGS. 3 and 4A, a contact position (inner contact position) where the outer peripheral surface of the outer ring 20 is in contact with the inner peripheral surface of both side portions across the central portion in the longitudinal direction of the leaf spring 27, and a contact position (outer contact position) where the inner peripheral surface of the slide member 26 is in contact with the outer peripheral surface of both side portions across the central portion in the longitudinal direction of the leaf spring 27 are brought into a state of being deviated from each other in the longitudinal direction of the leaf spring 27. In contrast, when a great meshing reaction force is applied to the worm shaft 6a from the meshing portion, as illustrated in FIG. 4B, both side portions across the central portion in the longitudinal direction of the leaf spring 27 are greatly and elastically deformed, thereby bringing the inner contact position and the outer contact position into a state of being coincident with each other in the longitudinal direction of the leaf spring 27. That is, in a case of the present embodiment, depending on a magnitude of the meshing reaction force applied to the worm shaft 6a from the meshing portion, the shape of both side portions across the central portion in the longitudinal direction of the leaf spring 27 is elastically changed into the shape illustrated in FIG. 4A or the shape illustrated in FIG. 4B. In this manner, the tip side bearing 9a is allowed to slightly move close to or apart from the worm wheel 4.

When the above-described structure according to the present embodiment is assembled, each member configuring the biasing means 25 is assembled and unitized in advance outside the holding recess 10a. Then, in this state, the biasing means 25 is assembled to the inside of the holding recess 10a through the outer end opening of the holding recess 10a. Thereafter, the cap 21 is assembled to the opening portion of the holding recess 10a.

In a case of the electric power steering device according to the present embodiment configured as described above, the resilience of the elastic ring 29 biases the slide member 26 against the base side bearing 8a side (base side in the longitudinal direction of the worm shaft 6a) along the second inclined cylindrical face portion 32. Based on this biasing, the worm gear 5 is biased toward the worm wheel 4. In other words, the resilience in the axial direction of the elastic ring 29 is converted into a force in the radial direction in the fitting portion between the first and second inclined cylindrical face portions 30 and 32, thereby biasing the worm gear 5 toward the worm wheel 4. Therefore, backlash is minimized in the meshing portion between the worm gear 5 and the worm wheel 4. In addition, in a case of the electric power steering device according to the present embodiment, the tip side portion of the worm shaft 6a does not need a portion which further projects to the tip side from the tip side bearing 9a. Therefore, the axial dimension of the tip side portion of the worm shaft 6a can be shortened correspondingly. As a result, it is possible to easily miniaturize a worm reduction gear configured to include the worm shaft 6a.

In addition, in a case of the present embodiment, the fitting portion between the second inclined cylindrical face portion 32 and the first inclined cylindrical face portion 30, and the fitting portion between the slide member 26 and the outer ring 20 also have no rattling in directions respectively perpendicular to the meshing direction and the axial direction of the worm shaft 6a (rightward and leftward directions in FIG. 3). Therefore, when rotational vibrations are applied from a wheel side to the steering shaft 2 (refer to FIG. 22) serving as the rotary shaft, based on a component in the perpendicular direction which is included in the meshing reaction force applied to the worm shaft 6a from the meshing portion, the worm gear 5 is vibrated in the perpendicular direction, thereby suppressing the occurrence of the gear rattling noise in the meshing portion.

In addition, in a case of the present embodiment, when the worm shaft 6a and the worm wheel 4 rotate, based on a dimensional error in the rotation direction of the worm shaft 6a and the worm wheel 4, a meshing position between the worm gear 5 and the worm wheel 4 is changed. When the tip side bearing 9a tends to move close to or apart from the worm wheel 4 in response to this change, the tip side bearing 9a is allowed to move close to or apart from the worm wheel 4, based on the elastic deformation of the leaf spring 27. As a result, a change in a force of biasing the worm gear 5 against the worm wheel 4 is suppressed, thereby suppressing a change in a friction force acting on the meshing portion.

Figure 26:
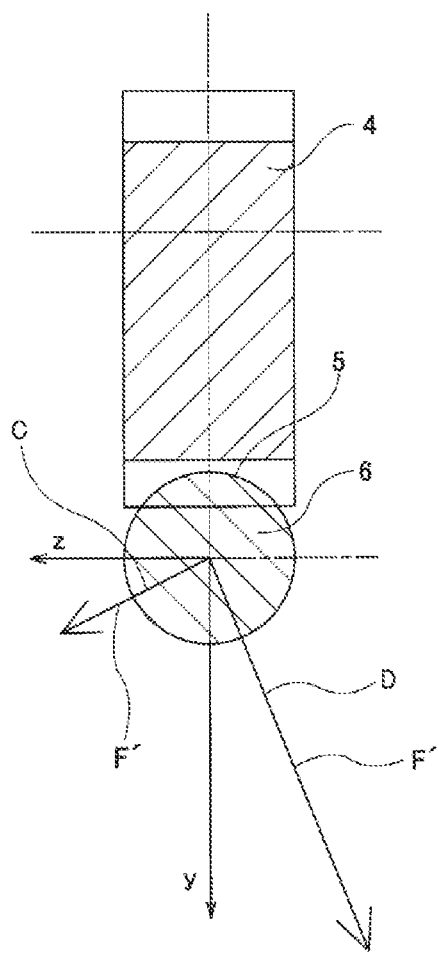
FIG. 26 illustrates the meshing reaction force in two directions which is applied from the worm wheel to the worm shaft when the electric motor is rotatably driven in both directions, and is the same drawing as FIG. 24B.

In addition, in a case of the present embodiment, in response to the rotation of the steering wheel in each direction, a component force {component force F' illustrated by the arrow C or the arrow D in FIGS. 3B and 26} in each direction is applied to the slide member 26. However, an inclined angle θ of the first inclined cylindrical face portion 30 and the second inclined cylindrical face portion 32 is as small as 5 degrees to 15 degrees. Accordingly, it is possible to sufficiently weaken a force which is generated by the component force and which moves the slide member 26 toward the side apart from the base side bearing 8a (left side in FIGS. 1 and 2) along the second inclined cylindrical face portion 32 and the outer peripheral surface of the outer ring 20. Furthermore, in a case of the present embodiment, this force can be received by the biasing force of the elastic ring 29. Therefore, the component force can prevent the slide member 26 from moving in this way.

When the present invention is embodied, with regard to the structure according to the present embodiment, the guide member 28 can also be formed integrally with the housing 3a.

Second Embodiment

Figure 5:
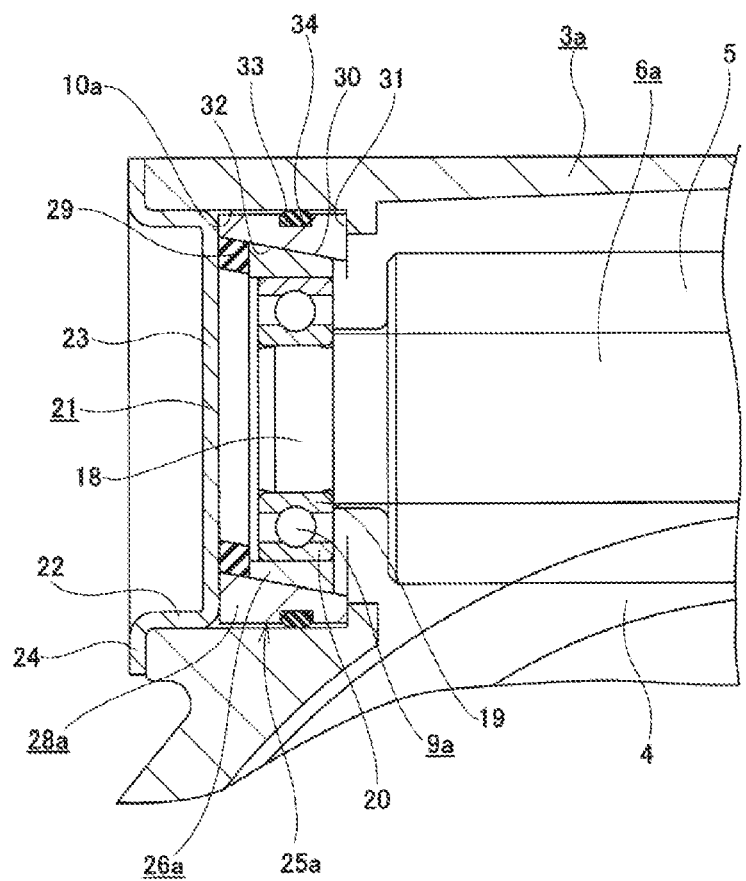
FIG. 5 illustrates a second embodiment according to the present invention, and is the same view as FIG. 2.

A second embodiment according to the present invention will be described with reference to FIG. 5.

In a case of the present embodiment, some points in a configuration of biasing means 25a are different from those according to the above-described first embodiment.

That is, in a case of the present embodiment, the leaf spring 27 (refer to FIGS. 2 and 3) is not assembled between the inner peripheral surface of the slide member 26a and the cylindrical outer peripheral surface of the outer ring 20 configuring the tip side bearing 9a. In a case of the present embodiment, the inner peripheral surface of the slide member 26a is a simple cylindrical surface whose central axis is coincident with the central axis of the slide member 26a. Then, the inner peripheral surface of the slide member 26a is externally fitted to the outer peripheral surface of the outer ring 20 so as to be displaceable along the axial direction of the outer peripheral surface {displaceable in the longitudinal direction (axial direction) of the worm shaft 6a} without any rattling in the radial direction. Alternatively, in a case of the present embodiment, the guide member 28a is loosely and internally fitted to the inner peripheral surface of the holding recess 10a (small clearance is disposed between the outer peripheral surface of the guide member 28a and the inner peripheral surface of the holding recess 10a). A rubber-made O-ring 34 locked in a locking groove 33 formed. over the entire periphery in an axially intermediate portion of the outer peripheral surface of the guide member 28a is elastically held between a bottom surface of the locking groove 33 and the inner peripheral surface of the holding recess 10a. In addition, in a case of the present embodiment, an axially inner surface (right side surface in FIG. 5) of the guide member 28a is in contact with a stepped surface 31 disposed in a back end portion of the holding recess 10a, and an axially outer surface (left side surface in FIG. 5) of the guide member 28a is in contact with an inner surface of the bottom plate portion 23 configuring the cap 21, in a state where both of these can easily and respectively slide in the radial direction.

Then, in a case of the present embodiment, when the worm shaft 6a and the worm wheel 4 rotate, based on a dimensional error in the rotation direction of the worm shaft 6a and the worm wheel 4, a meshing position between the worm gear 5 and the worm wheel 4 is changed. When the guide member 28a together with the tip side bearing 9a tends to move close to or apart from the worm wheel 4 in response to this change, the tip side bearing 9a is allowed to move close to or apart from the worm wheel 4, based on the elastic deformation of the O-ring 34. In this manner, a change in a force of biasing the worm gear 5 against the worm wheel 4 is suppressed, thereby suppressing a change in a friction force acting on the meshing portion between the worm wheel 4 and the worm gear 5.

Other configurations and operations are the same as those in the above-described case of the first embodiment, and thus repeated illustration and description will be omitted.

Third Embodiment

A third embodiment according to the present invention will be described with reference to FIG. 6.

In a case of the present embodiment, some points in a configuration of biasing means 25b are different from those according to the above-described first embodiment.

That is, in a case of the present embodiment, the second inclined cylindrical face portion 32 is formed integrally (directly) with the inner peripheral surface (inner peripheral surface of the holding recess 10b) of the housing 3a. In addition, in a case of the present embodiment, a configuration of the fitting portion between the inner peripheral surface of the slide member 26b and the outer peripheral surface of the outer ring 20 configuring the tip side bearing 9a adopts the same configuration as the above-described case of the second embodiment. Alternatively, in a case of the present embodiment, the first inclined cylindrical face portion 30 disposed on the outer peripheral surface of the slide member 26b is loosely and internally fitted to the second inclined cylindrical face portion 32 (small clearance is disposed between the first inclined cylindrical face portion 30 and the second inclined cylindrical face portion 32). A rubber-made O-ring 36 locked in a locking groove 35 formed over the entire periphery in an axially intermediate portion of the first inclined cylindrical face portion 30 is elastically held between a bottom surface of the locking groove 35 and the second inclined cylindrical face portion 32.

Then, in a case of the present embodiment, when the worm shaft 6a and the worm wheel 4 rotate, based on a dimensional error in the rotation direction of the worm shaft 6a and the worm wheel 4, a meshing position between the worm gear 5 and the worm wheel 4 is changed. When the tip side bearing 9a together with the slide member 26b tends to move close to or apart from the worm wheel 4 in response to this change, the tip side bearing 9a together with the slide member 26b is allowed to move close to or apart from the worm wheel 4, based on the elastic deformation of the O-ring 36. In this manner, a change in a force of biasing the worm gear 5 against the worm wheel 4 is suppressed, thereby suppressing a change in a friction force acting on the meshing portion between the worm wheel 4 and the worm gear 5.

In addition, in a case of the present embodiment, the second inclined cylindrical face portion 32 is directly formed on the inner peripheral surface of the holding recess lob. Accordingly, the central axis of the holding recess 10b is coincident with the central axis of the second inclined cylindrical face portion 32. In addition, an axially outer surface of the slide member 26b is a plane orthogonal to the central axis of the holding recess 10b. Then, an elastic ring 29a is compressed and held in the axial direction of the holding recess 10b between the axially outer surface of the slide member 26b and an inner surface of the bottom plate portion 23 of the cap 21 assembled to the opening portion of the holding recess 10b.

In addition, when the above-described structure according to the present embodiment is assembled, each member configuring the biasing means 25b is assembled to the inside of the holding recess 10b through the outer end opening of the holding recess 10b. Thereafter, the tip side bearing 9a which is externally fitted to and supported by the tip portion of the worm shaft 6a is inserted into the slide member 26b through an opening in an axially inner end (right end in FIG. 6) of the slide member 26b.

Other configurations and operations are the same as those in the above-described case of the first embodiment, and thus repeated illustration and description will be omitted.

Fourth Embodiment

Figure 7:
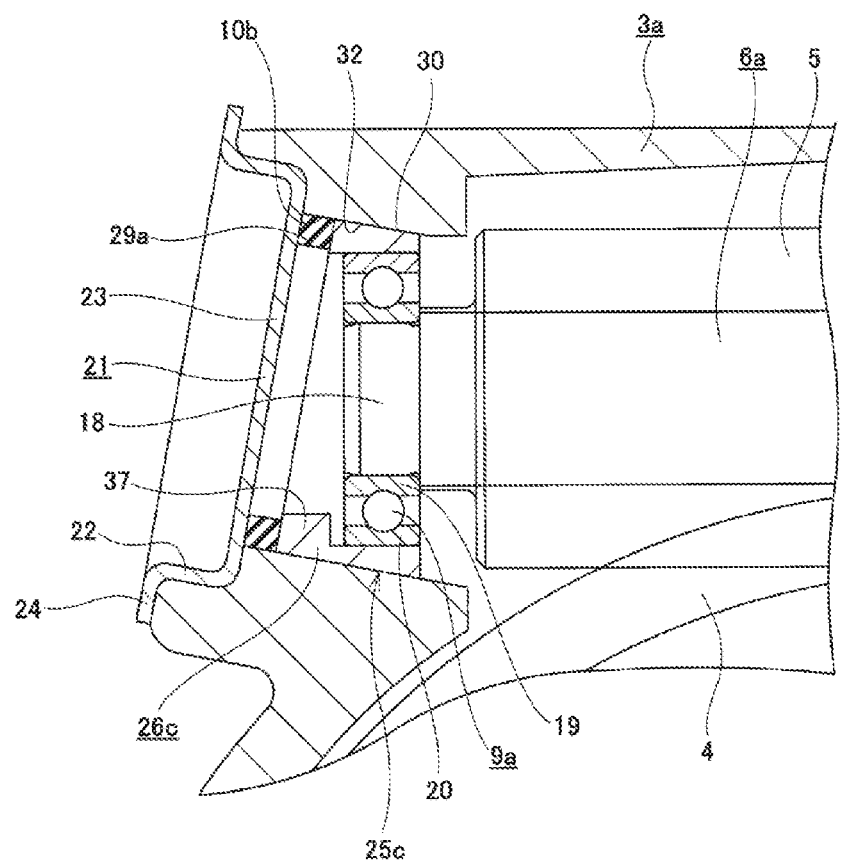
FIG. 7 illustrates a fourth embodiment according to the present invention, and is the same view as FIG. 2.

A fourth embodiment according to the present invention will be described with reference to FIG. 7.

In a case of the present embodiment, some points in a configuration of biasing means 25c are different from those in the above-described case of the third embodiment.

That is, in a case of the present embodiment, a configuration of the fitting portion between the second inclined cylindrical face portion 32 and the first inclined cylindrical face portion 30 adopts the same configuration as the above-described case of the first embodiment. In addition, a stopper projection 37 which projects further radially inward than a portion adjacent to the axially inner side is disposed in one portion on the worm wheel 4 side (lower side in FIG. 7) of the axially outer end portion of the inner peripheral surface of the slide member 26c. Then, an axially inner surface of the stopper projection 37 faces an axially outer surface of the outer ring 20 of the tip side bearing 9a. In this manner, the slide member 26c can be displaced to the base side bearing 8a side (right side in FIG. 7) with respect to the outer ring 20, only to a position where the axially inner surface of the stopper projection 37 and the axially outer surface of the outer ring 20 come into contact with each other.

When the present invention is embodied, with regard to the structure according to the present embodiment, a configuration of the fitting portion between the second inclined cylindrical face portion 32 and the first inclined cylindrical face portion 30 can also be changed to the same configuration (configuration in which the adjusting elastic member such as the O-ring is held) as the above-described case of the third embodiment.

Other configurations and operations are the same as those in the above-described case of the third embodiment, and thus repeated illustration and description will be omitted.

Fifth Embodiment

Figure 8:
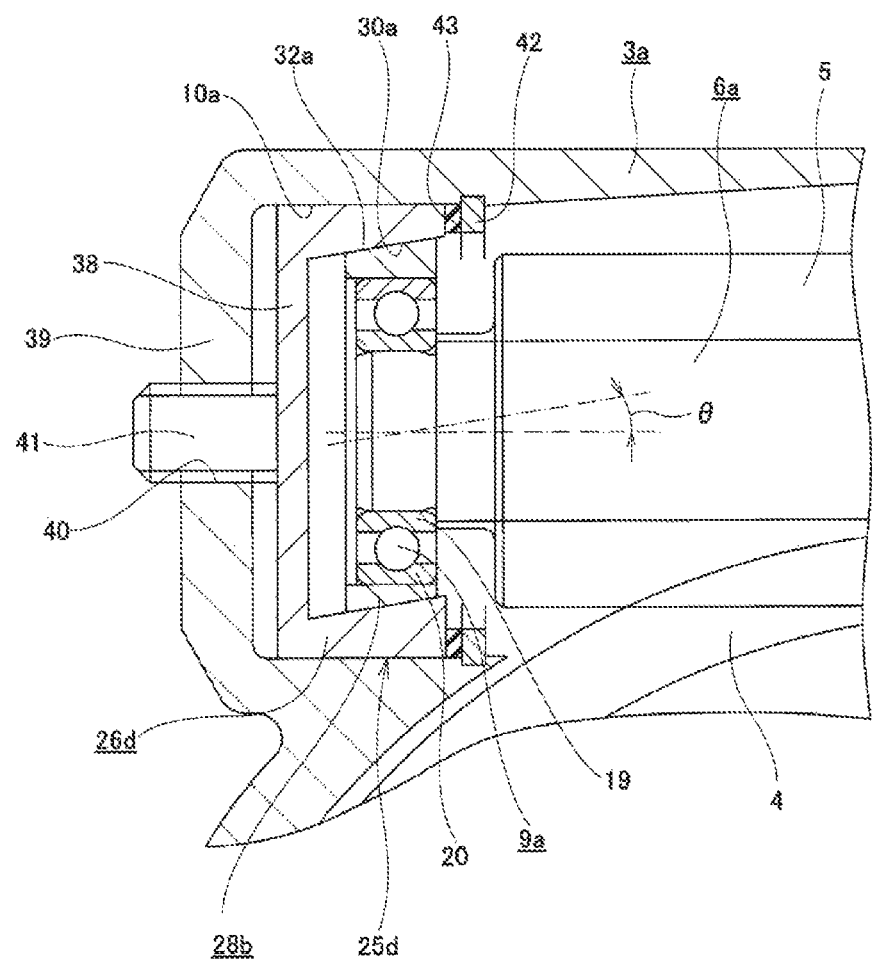
FIG. 8 illustrates a fifth embodiment according to the present invention, and is the same view as FIG. 2.

A fifth embodiment according to the present invention will be described with reference to FIG. 8.

In a case of the present embodiment, some points in a configuration of biasing means 25d are different from those in the above-described case of the first embodiment.

That is, in a case of the present embodiment, a slide member 26d having a bottomed cylindrical shape whose cross section has a substantially U-shape is internally fitted to the inner peripheral surface of the holding recess 10a of the housing 3a so as to be displaceable in the longitudinal direction (axial direction) of the worm shaft 6a without any rattling in the radial direction. The inner peripheral surface of the slide member 26d is a first inclined cylindrical face portion 30a which is inclined to the central axis of the tip side bearing 9a. In addition, a cylindrical guide member 28b is externally fitted and fixed to the outer peripheral surface of the outer ring 20 configuring the tip side bearing 9a by mean of interference fit. An outer peripheral surface of the guide member 28h is a second inclined cylindrical face portion 32a which is fitted to the first inclined cylindrical face portion 30a. In a case of the present embodiment, the inclined direction of the first and second inclined cylindrical face portions 30a and 32a is a direction toward the opposite side (upper side in FIG. 8) to the worm wheel 4 as it goes toward the base side bearing 8a side (base side of the worm shaft 6a in the longitudinal direction of the worm shaft 6a, right side in FIG. 8) in the axial direction of the tip side hearing 9a, inside a virtual plane orthogonal to the central axis of the worm wheel 4. In addition, the inclined angle θ of the first and second inclined cylindrical face portions 30a and 32a with respect to the central axis of the tip side bearing 9a is set to approximately 5 degrees to 15 degrees.

In addition, in a case of the present embodiment, the axially outer end opening of the holding recess 10a is closed by a closing plate portion 39 which is formed integrally with the housing 3a. A screw hole 40 is disposed in a central portion of the closing plate portion 39 in a state of penetrating the closing plate portion 39 in the axial direction. Then, a tip surface (right end surface in FIG. 8) of a stud bolt 41 screwed into the screw hole 40 is in contact with a central portion on an outer surface of a bottom plate portion 38 which is present on an outer end portion of the slide member 26d. In a case of the present embodiment, the stud bolt 41 corresponds to a biasing member according to the present invention. In addition, a rubber-made annular elastic ring 43 is compressed and held in the axial direction between an axially outer surface of a snap ring 42 locked in an axially inner end portion of the inner peripheral surface of the holding recess 10a and an axially inner surface of the slide member 26d. In this manner, a preload in the axial direction is applied to the stud bolt 41 via the slide member 26d, based on resilience of the elastic ring 43.

In a case of the present embodiment having the above-described configuration, a tool which engages with an engagement hole (not illustrated) disposed in a state of being open on a base surface (left end surface in FIG. 8) of the stud bolt 41 adjusts the amount of the stud bolt 41 screwed into the screw hole 40. Based on this adjustment, an axial position of the slide member 26d can be changed. In addition, in response to this change, the guide member 28b can be moved to or apart from the worm wheel 4 (displaced in the vertical direction in FIG. 8). Therefore, in a case of the present embodiment, based on the adjusted screwing amount of the stud bolt 41, the worm shaft 6a is caused to oscillate around the base side bearing 8a (refer to FIG. 1). In this manner, it is possible to remove the backlash in the meshing portion between the worm gear 5 and the worm wheel 4 by biasing the worm gear 5 toward the worm wheel 4.

In a case of the present embodiment, in a case of the present embodiment, in the illustrated assembled state, the stud bolt 41 biases the slide member 26d toward the base side bearing 8a side (right side in FIG. 8), based on its own fastening, in a case of the present embodiment, a range of biasing the worm gear 5 against the worm wheel 4 in response to the above-described biasing corresponds to only an amount of the preload which is provided for the meshing portion at the initial setting and which is generated in response to the fastening of the stud bolt 41.

In addition, in a case of the present embodiment, work for assembling the guide member 28b and the slide member 26d inside the holding recess 10a is carried out through the axially inner side opening portion of the holding recess 10a.

When the present invention is embodied, with regard to the structure according to the present embodiment, the outer ring 20 and the guide member 28b can also be formed integrally with each other (the second inclined cylindrical face portion 32a can be directly formed on the outer peripheral surface of the outer ring 20).

Figure 6:
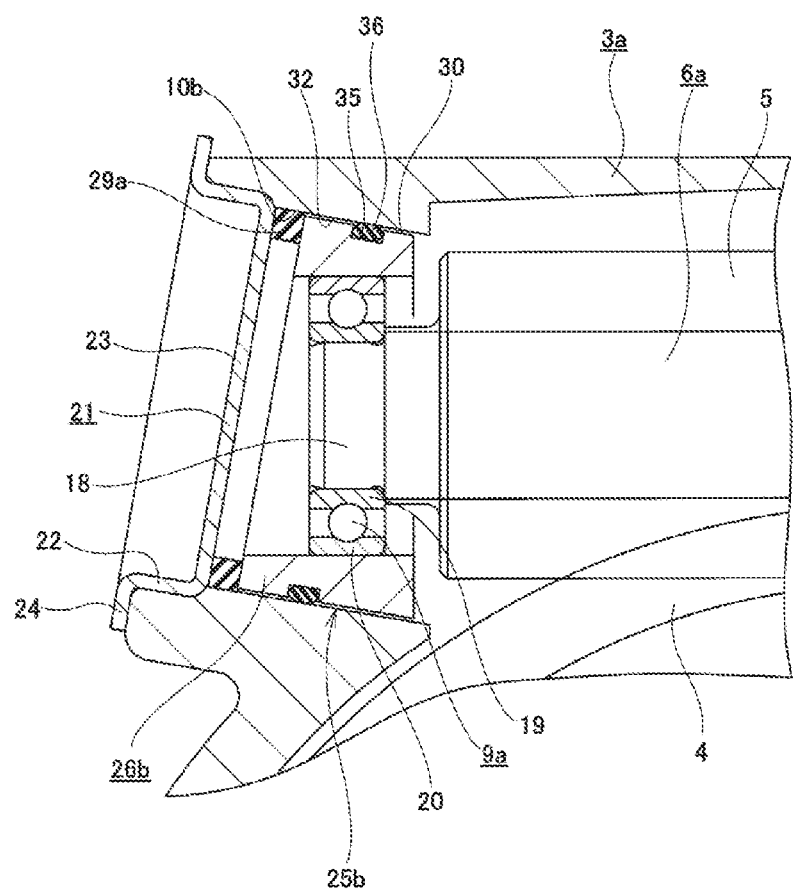
FIG. 6 illustrates a third embodiment according to the present invention, and is the same view as FIG. 2.

In addition, when the present invention is embodied, with regard to the structure according to the present embodiment, a configuration of the fitting portion between the second inclined cylindrical face portion 32a and the first inclined cylindrical face portion 30a or a configuration in the fitting portion between the outer peripheral surface of the slide member 26d and the inner peripheral surface of the holding recess 10a can also be changed to the same configuration (configuration in which the adjusting elastic member such as the O-ring is held) as the fitting portion between the first inclined cylindrical face portion 30 and the second inclined cylindrical face portion 32 according to the above-described third embodiment illustrated in FIG. 6.

Other configurations and operations are the same as those in the above-described case of the first embodiment, and thus repeated illustration and description will be omitted.

Figure 9:
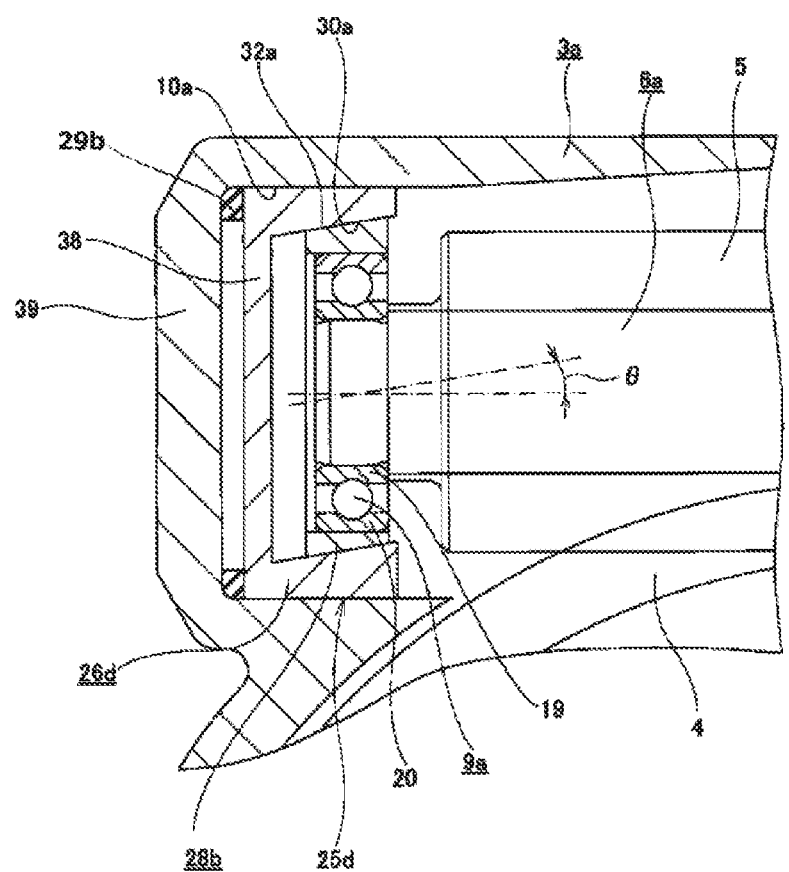
FIG. 9 illustrates a modification example of the fifth embodiment according to the present invention, and is the same view as FIG. 2.

With regard to the structure according to the present embodiment, as illustrated in FIG. 9, an elastic ring 29b serving as a biasing member may be disposed between the bottom plate portion 38 of the slide member 26d and the closing plate portion 39 of the housing 3a without using the stud bolt 41. Even in this case, the axial position of the slide member 26d is changed. In this manner, it is possible to remove the backlash in the meshing portion between the worm gear 5 and the worm wheel 4 by biasing the worm gear 5 toward the worm wheel 4.

Sixth Embodiment

Figure 10:
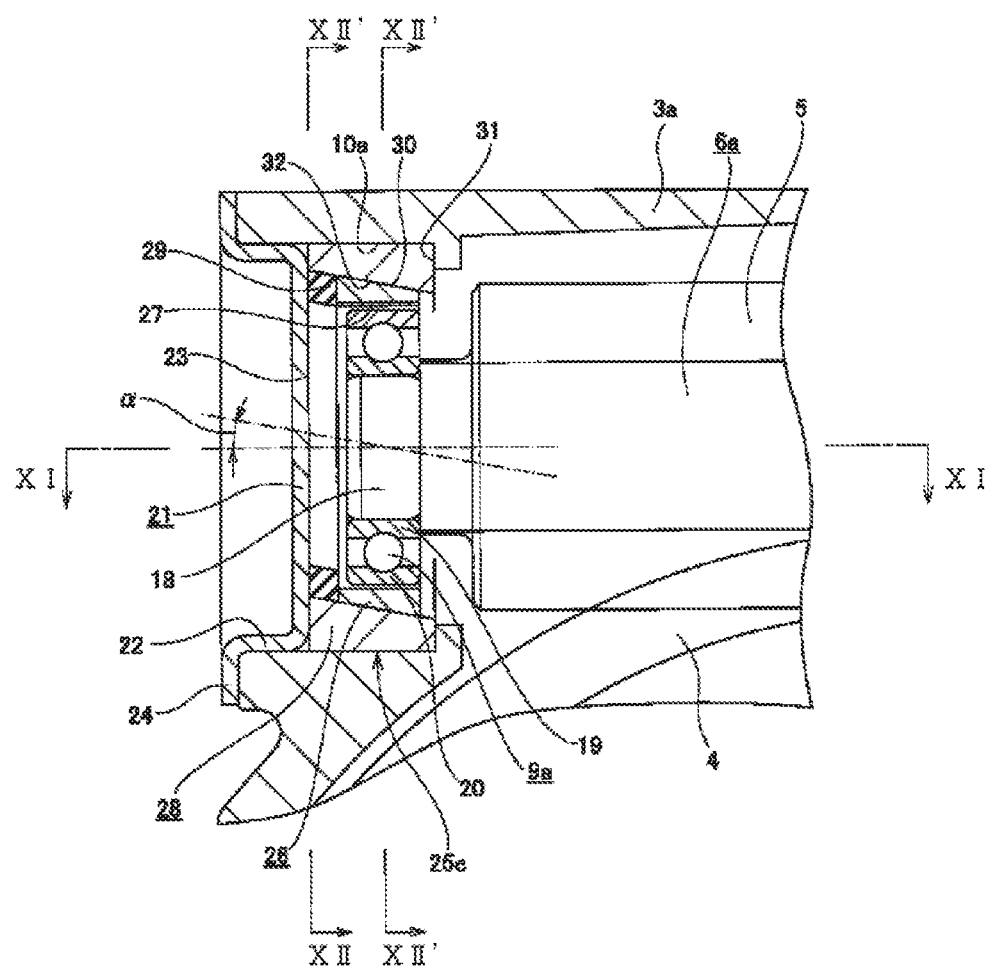
FIG. 10 illustrates a sixth embodiment according to the present invention, and is the same view as FIG. 2.
Figure 11:
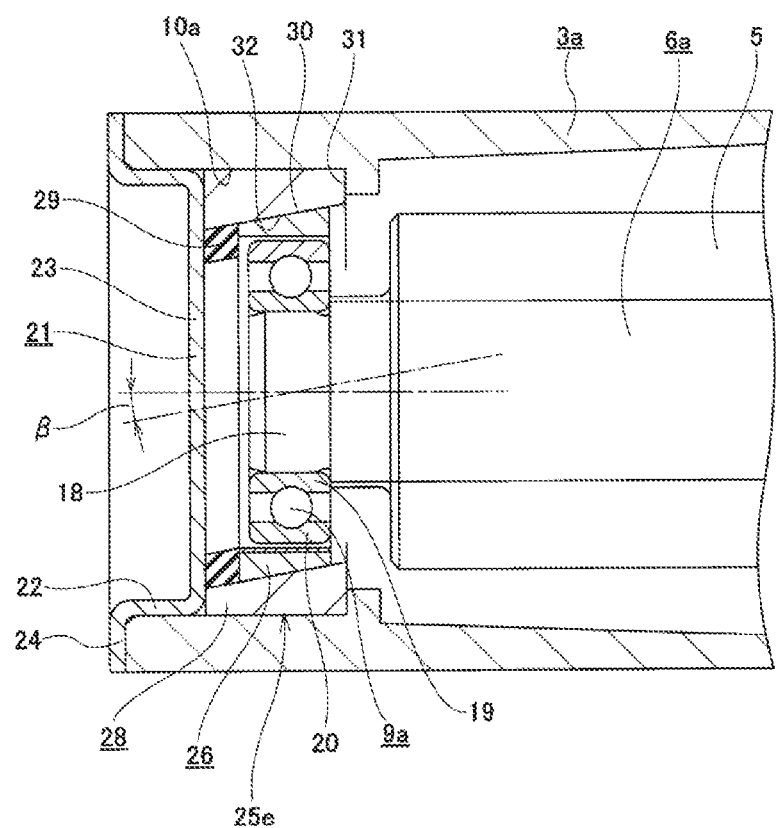
FIG. 11 is a sectional view taken along line XI-XI in FIG. 10.

A sixth embodiment according to the present invention will be described with reference to FIGS. 10 to 12.

In a case of the present embodiment, a direction in which biasing means 25e biases the tip portion of the worm shaft 6a toward the worm wheel 4 via the tip side bearing 9a is different from that in the above-described case of the first embodiment.

That is, in a case of the present embodiment, the biasing means 25e biases the tip portion of the worm shaft 6a toward the worm wheel 4 via the tip side bearing 9a in a direction of a bisector $L_D$ of an angle formed between a vector of a component force {component force F' illustrated by the arrow C in FIGS. 12 and 26} inside a virtual plane orthogonal to the worm shaft 6a of the meshing reaction force applied to the worm shaft 6a from the meshing portion between the worm wheel 4 and the worm gear 5 when a steering wheel 1 (refer to FIG. 22) is rotated to one side in the rightward and leftward directions and a vector of a component force (component force F' illustrated by the arrow D in FIGS. 12 and 26) inside a virtual plane orthogonal to the worm shaft 6a of the meshing reaction force applied to the worm shaft 6a from the meshing portion when the steering wheel 1 is rotated to the other side in the rightward and leftward directions. Therefore, a case of the present embodiment regulates each inclined angle of the first inclined cylindrical face portion 30 and the second inclined cylindrical face portion 32 with respect to the central axis of the tip side bearing 9a {an inclined angle α in FIG. 10 which is a sectional view taken along a virtual plane which is orthogonal to the central axis of the worm wheel 4 and which includes the central axis of the tip side bearing 9a and an inclined angle β in FIG. 11 which is a sectional view taken along line XI-XI in FIG. 10 (sectional view with regard to a virtual plane which is parallel to the central axis of the worm wheel 4 and which includes the central axis of the worm shaft 6a)}. Furthermore, the longitudinal direction of an oval shape which is a cross-sectional shape of the inner peripheral surface of the slide member 26 is coincident with the direction of the bisector $L_D$. A central portion in the longitudinal direction of the leaf spring 27 is arranged at the opposite position to the worm wheel 4 in the direction of the bisector $L_D$ in a section between the inner peripheral surface of the slide member 26 and the outer peripheral surface of the outer ring 20 of the tip side bearing 9a.

In a case of the present embodiment having the above-described configuration, when the meshing reaction force is applied to the worm shaft 6a from the meshing portion, the outer peripheral surface of the outer ring 20 presses the leaf spring 27 (and inner peripheral surface of the slide member 26) at two positions P and Q which are line-symmetric with respect to a straight line (bisector $L_D$) indicating a biasing direction of the tip portion of the worm shaft 6a. Abrasion amounts of the leaf spring 27 (and inner peripheral surface of the slide member 26) at the respective positions P and Q can be made substantially equal to each other.

Other configurations and operations are the same as those in the above-described case of the first embodiment, and thus repeated illustration and description will be omitted.

When the present invention is embodied, with regard to the above-described structure according to the respective embodiments, as a separate method, one circumferential portion on the peripheral surface on the side having the first inclined cylindrical face portion of the slide member and one circumferential portion on the peripheral surface on the side having the second inclined cylindrical face portion of a member having the second inclined cylindrical face portion are caused to mechanically engage with each other (for example, the engagement recess and the engagement projection which are formed in each portion are caused to engage with each other, or planar portions which are formed in each portion are brought into contact with each other). In this manner, it is also possible to prevent relative rotation between the slide member and the member having the second inclined cylindrical face portion.

Seventh Embodiment

Figure 13:
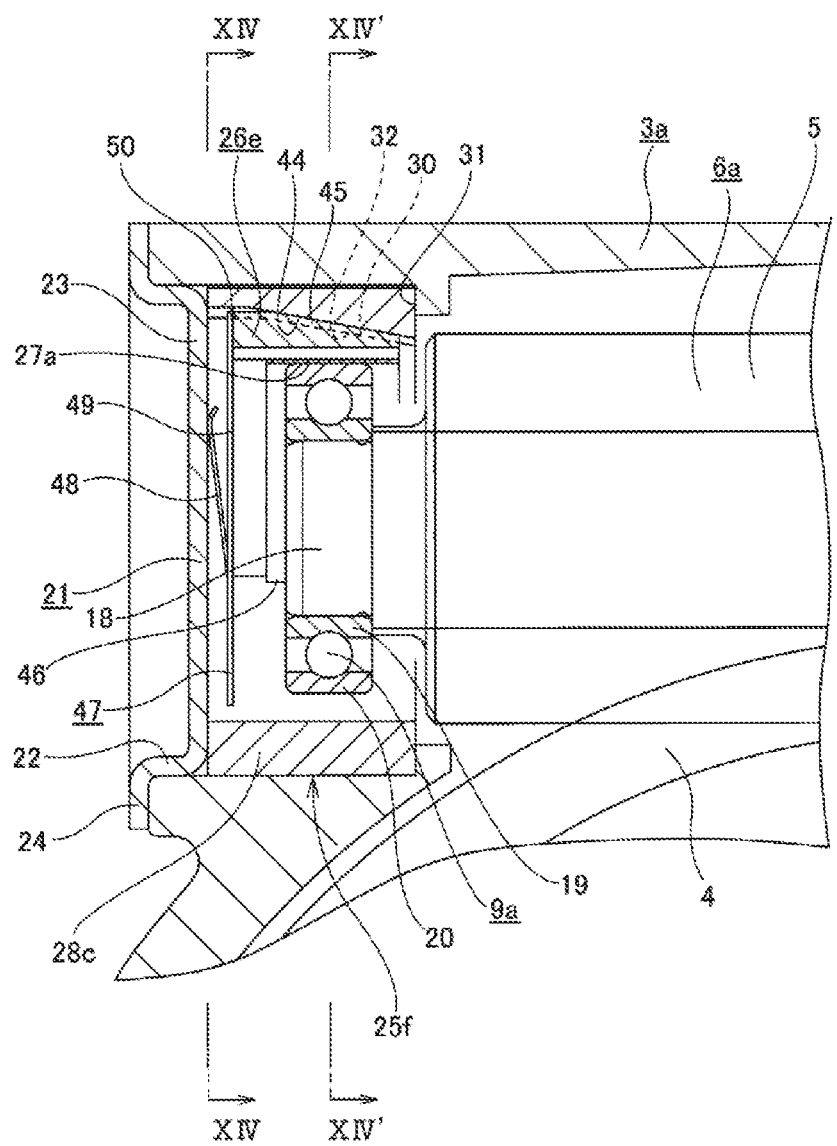
FIG. 13 illustrates a seventh embodiment according to the present invention, and is the same view as FIG. 2.

A seventh embodiment according to the present invention will be described with reference to FIGS. 13 and 14.

In a case of the present embodiment, some points of a configuration of biasing means 25f are different from the above-described case of the first embodiment.

In a case of the present embodiment, among an outer peripheral surface of a slide member 26e and an inner peripheral surface of a guide member 28c which are fitted to each other, the respective first and second inclined cylindrical face portions 30 and 32 are disposed in only a circumferential range whose central angle is approximately 180 degrees (for example, 180±10 degrees) and which is located on the opposite side (upper side in FIGS. 13 and 14) to the worm wheel 4 in a direction in which the biasing means 25f biases the tip portion of the worm shaft 6a.

That is, in a case of the present embodiment, the slide member 26e is configured to have a semi-cylindrical shape whose cross section has an inverted U-shape. Then, a whole-circumferentially intermediate portion of the outer peripheral surface of the slide member 26e is the first inclined cylindrical face portion 30.

In a case of the present embodiment, the slide member 26e is formed in the semi-cylindrical shape which is a partially cylindrical shape instead of a whole-circumferentially linked cylindrical shape. In this manner, the material cost and the weight of the slide member 26e are reduced.

In the inner peripheral surface of the guide member 28c entirely configured to have a substantially cylindrical shape, a portion facing the outer peripheral surface of the slide member 26e has a shape which is coincident with the outer peripheral surface of the slide member 26e. In particular, a portion facing the first inclined cylindrical face portion 30 is the second inclined cylindrical face portion 32.

In addition, an engagement projection 45 formed in a circumferentially central portion of the first inclined cylindrical face portion 30 engages with an engagement recess 44 formed in a circumferentially central portion of the second inclined cylindrical face portion 32. Concurrently, a pair of planar portions 52 and 52 formed in a portion adjacent to both sides in the circumferential direction of the second inclined cylindrical face portion 32 are in close contact (engage) with planar portions 53 and 53 formed in a portion facing the respective planar portions 52 and 52 of the inner peripheral surface of the guide member 28c. Then, the respective planar portions 52 and 53 engage with each other, and the engagement recess 44 and the engagement projection 45 engage with each other. In this manner, positioning and rotation preventing of the slide member 26e in the circumferential direction with respect to the guide member 28c are achieved. However, the positioning and rotation preventing of the slide member 26e in the circumferential direction can also be achieved by only one engagement of the engagement between the respective planar portions 52 and 53 and the engagement between the engagement recess 44 and the engagement projection 45. In a case of the present embodiment, in the respective first and second inclined cylindrical face portions 30 and 32, circumferential widths of portions located on both sides in the circumferential direction of the engagement projection 45 and the engagement recess 44 are respectively in a range of 90 degrees or smaller at the central angle.

In addition, a configuration, installation form, and inherent function of the leaf spring 27a disposed between the inner peripheral surface of the slide member 26e and the outer peripheral surface of the outer ring 20 configuring the tip side bearing 9a are the same as those in the above-described case of the leaf spring 27 according to the first embodiment. In a case of the present embodiment, additionally, locking portions 46 and 46 which are respectively bent radially outward are disposed in both end portions in the circumferential direction of the leaf spring 27a. Both the locking portions 46 and 46 are caused to engage with both faces in the circumferential direction of the slide member 26e. In this manner, positioning and rotation preventing of the leaf spring 27a in the circumferential direction with respect to the slide member 26e are achieved.

In addition, as a biasing member configuring the biasing means 25f, instead of the elastic ring 29 (refer to FIG. 2), a case of the present embodiment employs a leaf spring portion 48 configuring a biasing plate 47 which is internally fitted to an outer end portion (left end portion in FIG. 13) of the guide member 28c. The biasing plate 47 includes a flat plate-shaped substrate portion 49 which is plate-shaped member and has a substantially circular shape, and the leaf spring portion 48 which is formed by a U-shaped and notched inner side portion formed in the substantially central portion of the substrate portion 49 being bent upward and axially outward (leftward in FIG. 13). Then, the substrate portion 49 is internally fitted to the inner peripheral surface in the outer end portion of the guide member 28c so as not to be rotatable (non-circular fitting is performed by causing an engagement projection 50 disposed in an outer peripheral edge of the substrate portion 49 to engage with the engagement recess 44). In a state where a radially outer end portion (outer peripheral portion) on an inner surface (right side surface in FIG. 13) of the substrate portion 49 is brought into contact with an outer end surface (left end surface in FIG. 13) of the slide member 26e, the tip portion of the leaf spring portion 48 is in elastic contact with an inner surface (right side surface in FIG. 13) of the bottom plate portion 23 of the cap 21. In this manner, based on resilience of the leaf spring portion 48, the slide member 26e is biased radially inward (rightward in FIG. 13).

Therefore, a contact position where the outer end surface of the slide member 26e and the radially outer end portion on the inner surface of the flat plate-shaped substrate portion 49 are in contact with each other and a contact position where the tip portion of the leaf spring portion 48 and the inner surface of the bottom plate portion 23 of the cap 21 are in contact with each other are deviated from each other in the longitudinal direction of the worm shaft 6.

As described above, a case of the present embodiment adopts a configuration in which the outer end surface of the slide member 26e is pressed (biased axially inward) by the leaf spring portion 48 via the substrate portion 49. Therefore, compared to a case adopting a configuration in which the outer end surface of the slide member 26e is directly pressed by a biasing member, a degree of freedom in design (degree of freedom in arranging the biasing member) is improved. Concurrently, the slide member 26e which is not whole-circumferentially linked (which has a semi-cylindrical shape) can be stably biased in the axial direction.

Other configurations and operations are the same as those in the above-described case of the first embodiment, and thus repeated illustration and description will be omitted.

Eighth Embodiment

Figure 15:
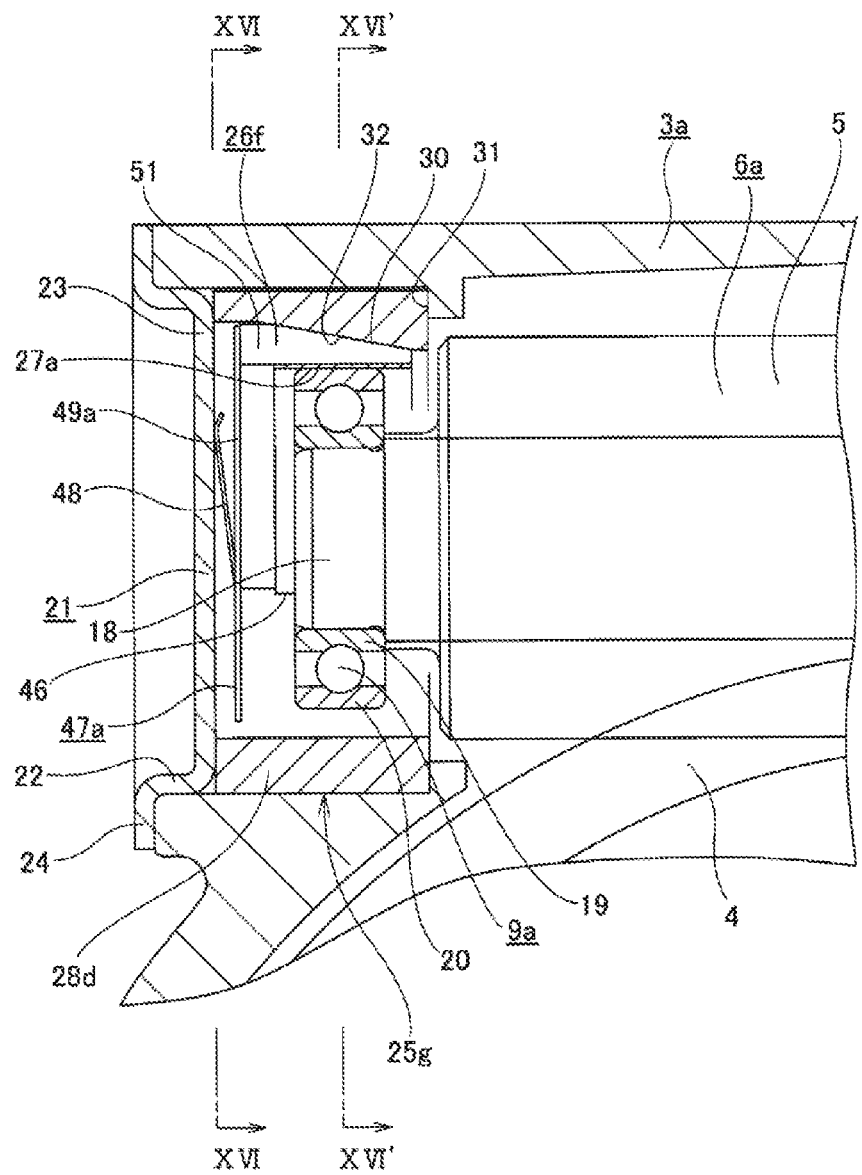
FIG. 15 illustrates an eighth embodiment according to the present invention, and is the same view as FIG. 2.
Figure 16:
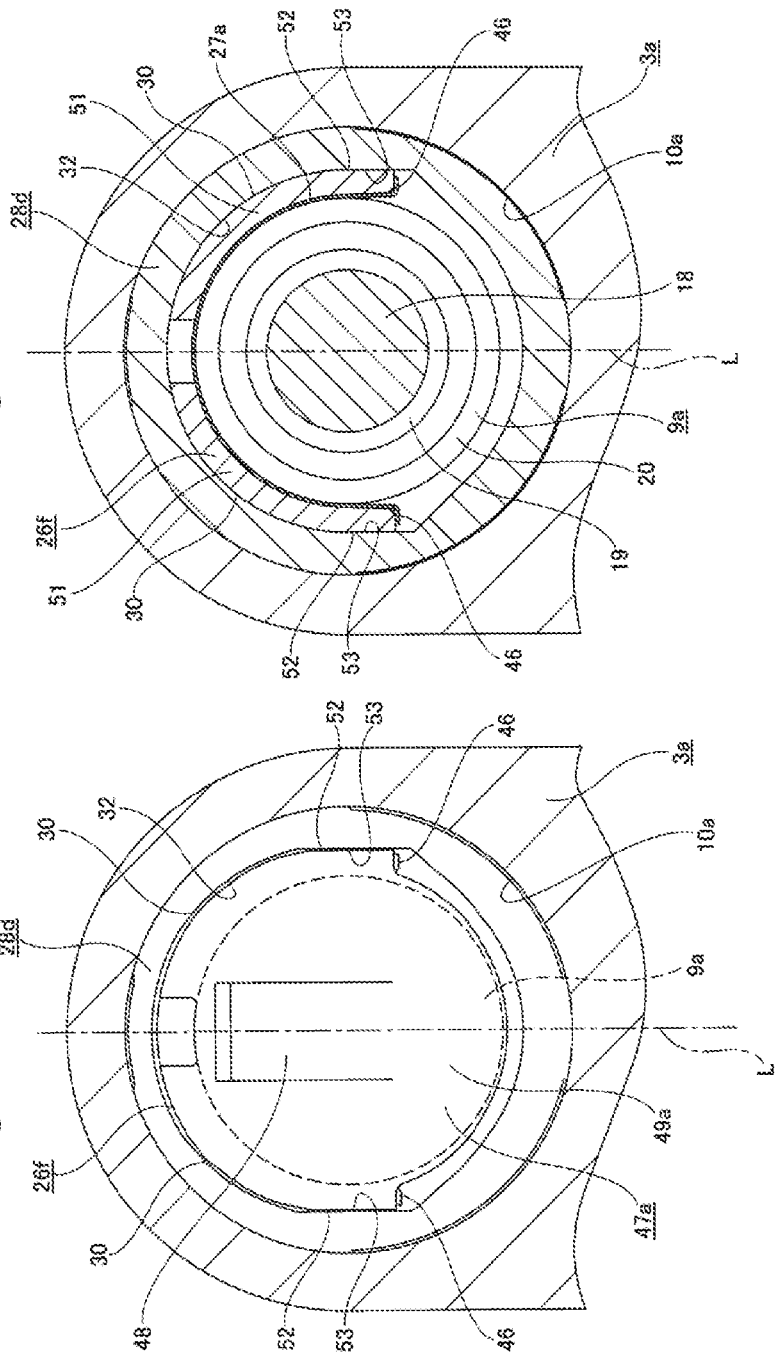
FIG. 16A is a sectional view taken along line XVI-XVI in FIG. 15.
FIG. 16B is a sectional view taken along line XVI'-XVI' in FIG. 15.

An eighth embodiment according to the present invention will be described with reference to FIGS. 15 and 16.

In a case of the present embodiment, some points of a configuration of biasing means 25g are different from those in the above-described case of the seventh embodiment.

That is, in a case of the present embodiment, a slide member 26f includes a pair of split elements 51 and 51 having a shape in which the slide member 26e according to the above-described seventh embodiment cut off into two pieces in the circumferentially central portion (the circumferentially central portion is removed).

In a case of the present embodiment, in this way, the slide member 26f includes the pair of split elements 51 and 51 which are respectively made in a partially cylindrical shape and are arranged apart from each other in the circumferential direction. Accordingly, the material cost and the weight of the slide member 26f are further reduced.

In addition, in a case of the present embodiment, planar portions 52 and 52, which i s disposed in end portions on sides far from each other in the circumferential direction, of the outer peripheral surface of the respective split elements 51 and 51 come into close contact (engage) with planar portions 53 and 53, which is disposed in portions facing the respective planar portions 52 and 52, of the inner peripheral surface of the guide member 28d. In this manner, positioning and rotation preventing of the respective split elements 51 and 51 in the circumferential direction with respect to the guide member 28d are achieved. In a case of the present embodiment, the engagement recess 44 and the engagement projection 45 (refer to FIG. 13) are not disposed on the inner peripheral surface of the guide member 28d and the outer peripheral surface of the slide member 26f. Portions except for the planar portion 52 of the outer peripheral surface of the respective split elements 51 and 51 are respectively the first inclined cylindrical face portions 30. In addition, in a case of the present embodiment, the slide member 26f having no whole-circumferentially linked cylindrical shape (which includes the pair of split elements 51 and 51 separated from each other in the circumferential direction) can be stably biased in the axial direction by the leaf spring portion 48 via the substrate portion 49 configuring the biasing plate 47.

Other configurations and operations are the same as those in the above-described case of the seventh embodiment, and thus repeated illustration and description will be omitted.

Figure 17:
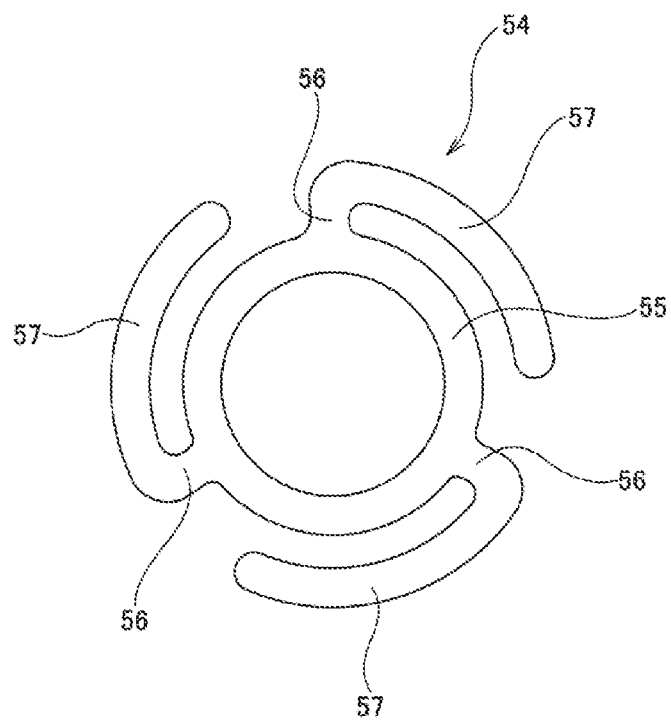
FIG. 17 is a plan view obtained when viewed in an axial direction of a leaf spring which can be used as a biasing member.
Figure 18:
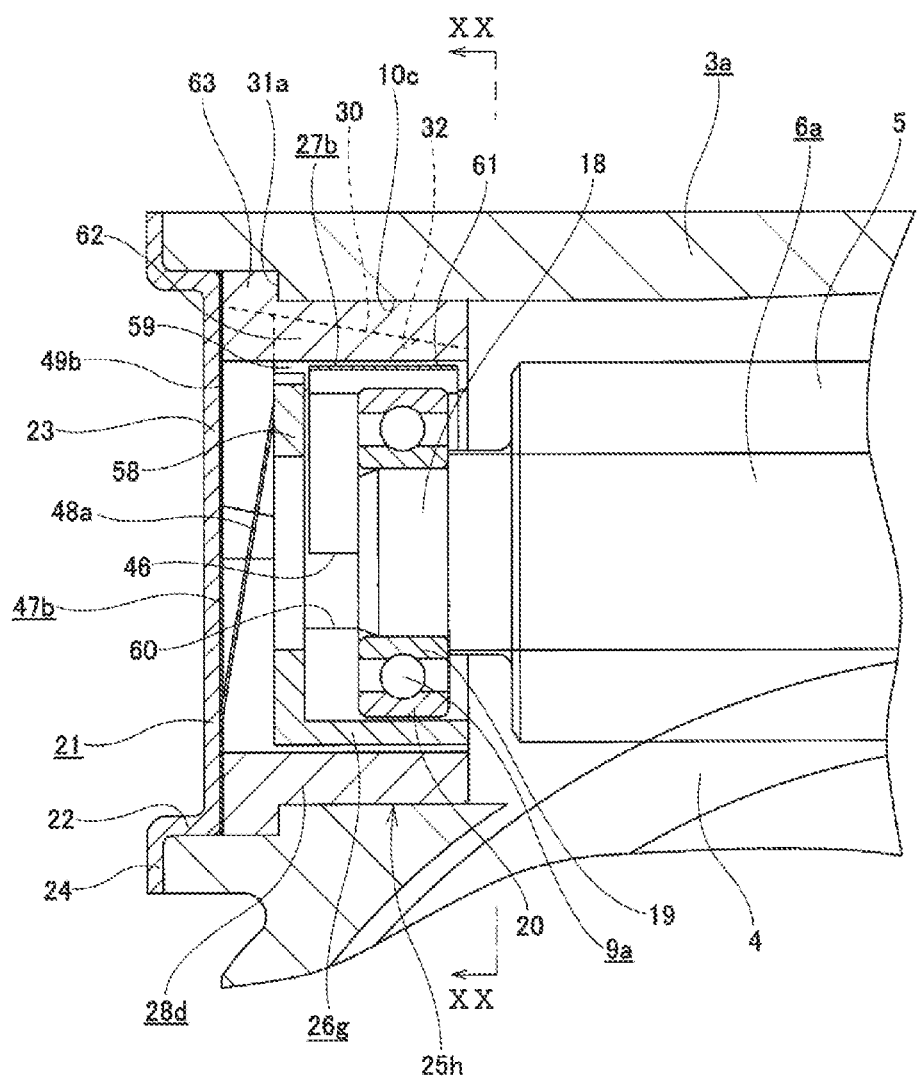
FIG. 18 illustrates a ninth embodiment according to the present invention, and is a sectional view taken along line XVIII-XVIII in FIG. 20.
Figure 19:
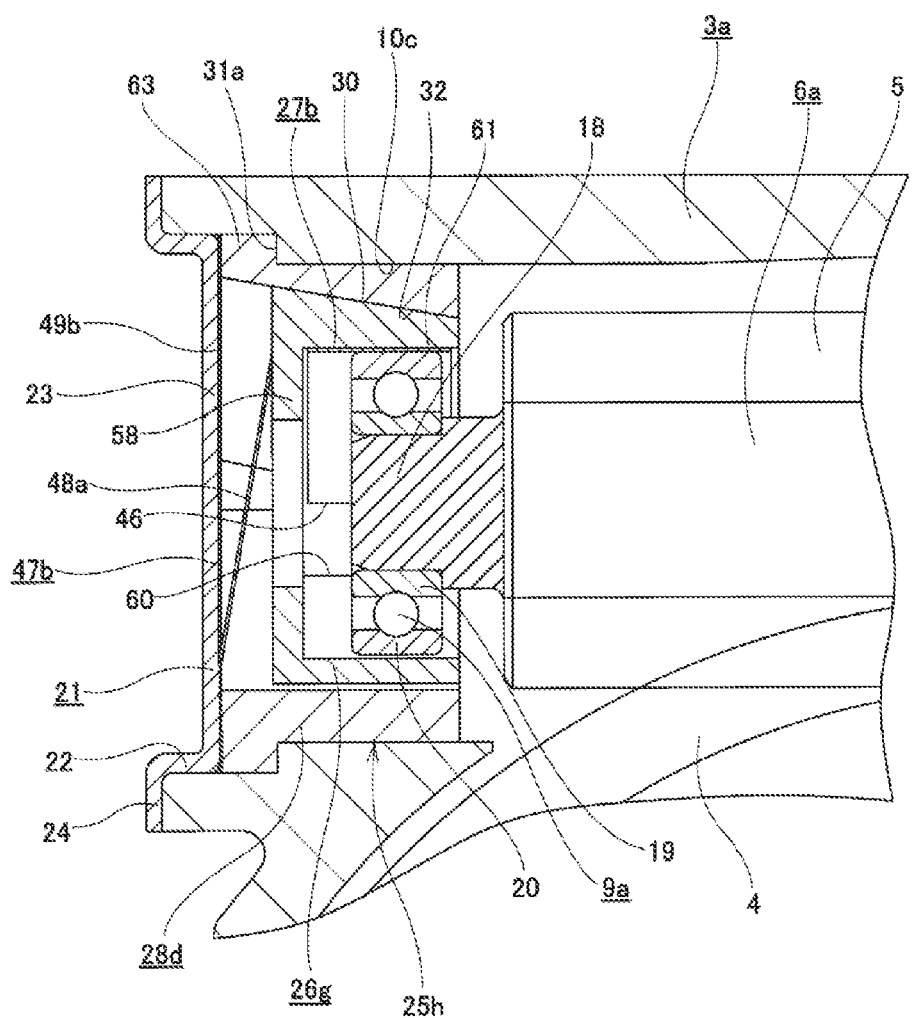
FIG. 19 illustrates the ninth embodiment according to the present invention, and is a sectional view taken along line XIX-XIX in FIG. 20.
Figure 20:
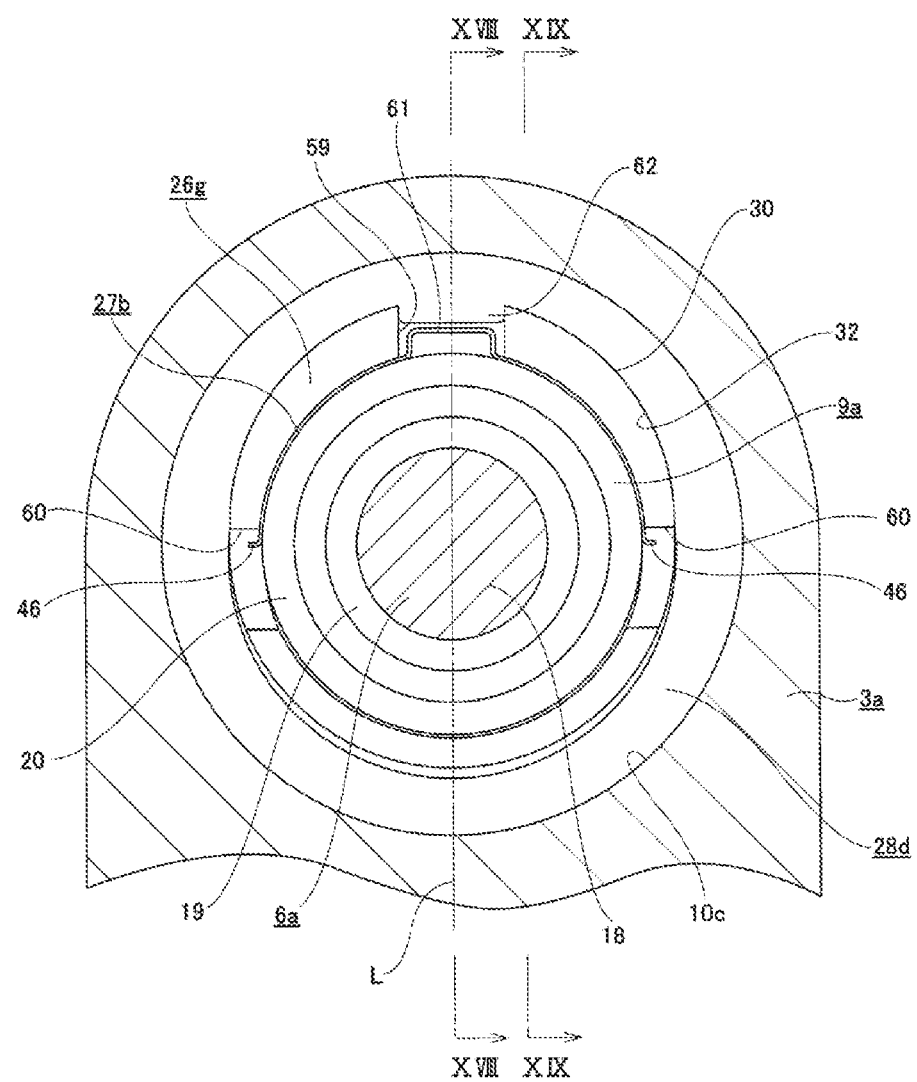
FIG. 20 is a sectional view taken along line XX-XX in FIG. 18.
Figure 21:
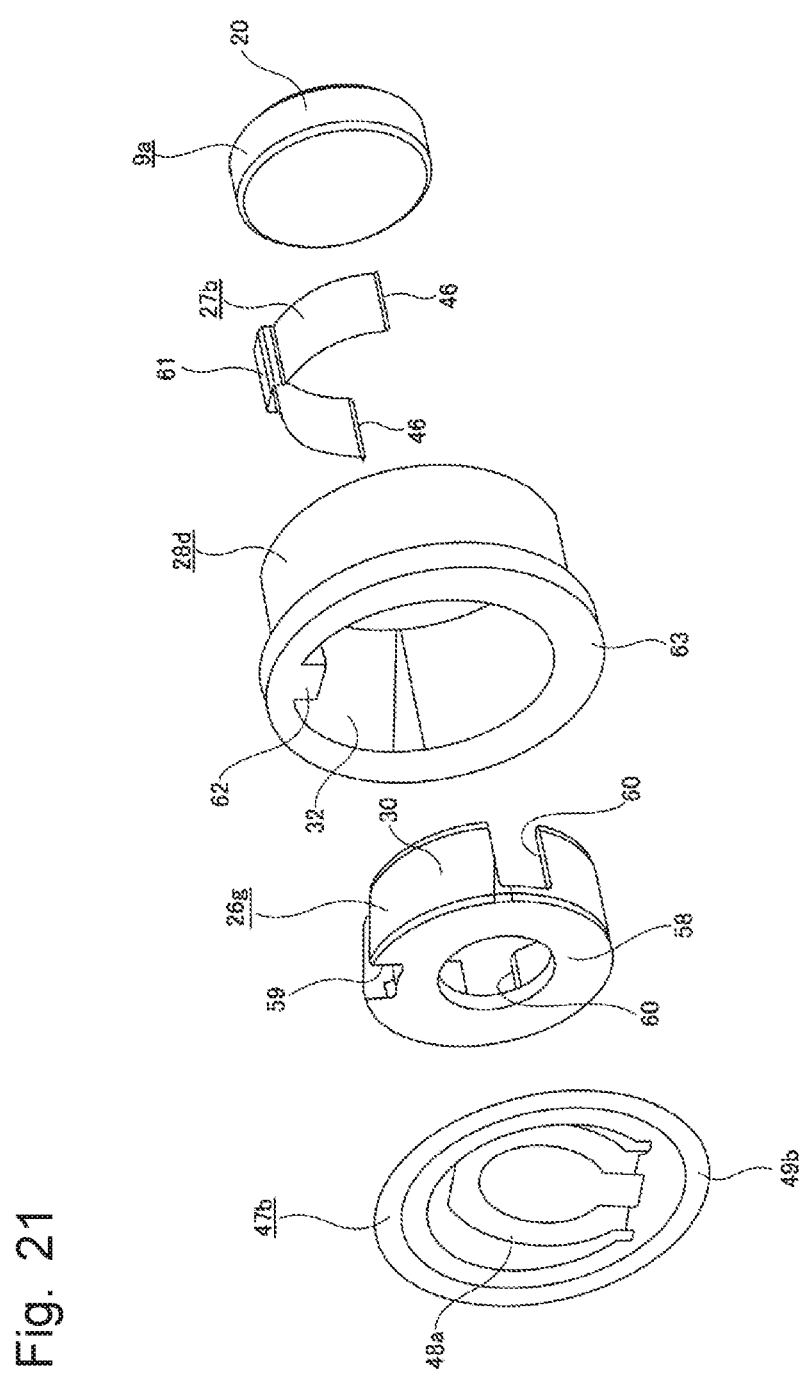
FIG. 21 is an exploded perspective view illustrating biasing means and a tip side bearing which are partially omitted.

When the present invention is embodied, as a modification example of the above-described seventh and eighth embodiments, it is also possible to adopt a configuration without forming the leaf spring portion 48 integrally with the biasing plate 47 (47a), that is, a configuration in which the biasing plate 47 (47a) includes only the substrate portion 49 (49a), and in which separate rubber or a separate spring serving as a biasing member is elastically compressed and held between the outer surface of the substrate portion 49 (49a) and the inner surface of the bottom plate portion 23 of the cap 21. For example, as this separate spring, it is possible to employ a leaf spring 54 as illustrated in FIG. 17. The leaf spring 54 has a circular ring-shaped plate portion 55 which is present in the central portion, and arcuate spring plate portions 57 and 57 which are connected via connection plate portions 56 and 56 to multiple locations (in the illustrated example, three locations at equal intervals in the circumferential direction) in the circumferential direction of an outer peripheral edge portion of the circular ring-shaped plate portion 55. The leaf spring 54 causes the respective spring plate portions 57 and 57 to be inclined in a direction toward an axially one side of the circular ring-shaped plate portion 55 as it goes toward the respective tip sides.

Ninth Embodiment

A ninth embodiment according to the present invention will be described with reference to FIGS. 18 to 21.

In a case of the present embodiment, some points of a configuration of biasing means 25h are different from those in the above-described case of the first embodiment.

In a case of the present embodiment, similarly to the above-described case of the first embodiment, both a slide member 26g and a guide member 28d are configured to have a whole circumferentially linked annular shape (substantially cylindrical shape). However, in a case of the present embodiment, in an outer peripheral surface of the slide member 26g and an inner peripheral surface of the guide member 28d, the respective first and second inclined cylindrical face portions 30 and 32 are disposed in only a circumferential range whose central angle is approximately 180 degrees (for example, 180±10 degrees) and which is located on the opposite side (upper side in FIGS. 18 to 20) to the worm wheel 4 in a direction in which the biasing means 25h biases the tip portion of the worm shaft 6a. In the outer peripheral surface of the slide member 26g and the inner peripheral surface of the guide member 28d, portions separated from the circumferential range are cylindrical surfaces which do not come into contact with each other when in use (in the illustrated example, partially cylindrical or partially elliptical and cylindrical curved surface which is not inclined to the central axis of the respective members 26g and 28d except for a continuous portion with both end portions in the circumferential direction of the respective first and second inclined cylindrical face portions 30 and 32).

In addition, an inward flange portion 58 is disposed in an axially outer end portion of the inner peripheral surface of the slide member 26g. In addition, in a main body portion (portion other than the inward flange portion 58) of the slide member 26g, a portion corresponding to the central portion of the first inclined cylindrical face portion 30 has a first cut portion 59 formed by removing the corresponding portion. Furthermore, in the main body portion (portion other than the inward flange portion 58) of the slide member 26g, in a portion excluding a portion radially overlapping the inward flange portion 58, portions adjacent to both sides of the first inclined cylindrical face portion 30 has second cut portions 60 and 60 formed by removing the respective corresponding portions.

In addition, a configuration, installation form, and inherent function of a leaf spring 27b disposed between the portion separated from the inward flange portion 58 of the inner peripheral surface of the slide member 26g and the outer peripheral surface of the outer ring 20 configuring the tip side bearing 9a are basically the same as those in the above-described case of the leaf spring 27 according to the first embodiment. However, in a case of the present embodiment, additionally, an outward engagement projection 61 curvedly formed so as to project radially outward compared to the portion adjacent to both sides in the circumferential direction is disposed in a circumferentially central portion of the leaf spring 27b. Locking portions 46 and 46 formed in a state of being respectively bent radially outward are disposed in both end portions in the circumferential direction of the leaf spring 27b. Then, in a case of the present embodiment, an axially outer end edge of the leaf spring 27b is moved close to or brought into contact with the inner surface (right side surface in FIGS. 18 and 19) of the inward flange portion 58 configuring the slide member 26g. In this manner, positioning of the leaf spring 27b in the axial direction with respect to the slide member 26g is achieved. In addition, the outward engagement projection 61 of the leaf spring 27b is caused to engage with an inner diameter side portion of the first cut portion 59 configuring the slide member 26g. Both the locking portions 46 and 46 are caused to engage with inner surfaces on the opposite side (upper side in FIG. 20) to the worm wheel in both the second cut portions 60 and 60 configuring the slide member 26g. In this manner, positioning of the leaf spring 27b in the circumferential direction with respect to the slide member 26g is achieved.

In the inner peripheral surface of the guide member 28d, an inward engagement projection 62 which projects radially inward compared to a portion adjacent to both sides in the circumferential direction is disposed in a portion corresponding to the central portion of the second inclined cylindrical face portion 32 in the circumferential direction. Then, in a case of the present embodiment, the inward engagement projection 62 is caused to engage with an outside diameter portion of the first cut portion 59 configuring the slide member 26g. In this manner, positioning of the slide member 26g in the circumferential direction with respect to the guide member 28d is achieved. In addition, an outward flange portion 63 is disposed in an axially outer end portion of the outer peripheral surface of the guide member 28d. Then, in a case of the present embodiment, the outward flange portion 63 is held in the axial direction between a stepped surface 31a present in a portion close to an axially outer end of a holding recess 10c of the housing 3a and the inner surface of the bottom plate portion 23 of the cap 21. In this manner, positioning of the guide member 28d in the axial direction with respect to the housing 3a is achieved.

In addition, as a biasing member configuring the biasing means 25h, instead of the elastic ring 29 (refer to FIG. 2), a case of the present embodiment employs a leaf spring portion 48a configuring a biasing plate 47b which is internally fitted to a portion close to the outer end of the holding recess 10c. The biasing plate 47b includes a circular ring-shaped substrate portion 49b and the Ω-shaped leaf spring portion 48a whose base portion is connected to a portion on the worm wheel 4 side (lower side in FIGS. 18, 19, and 21) in a direction in which the biasing means 25h biases the tip portion of the worm shaft 6a of an inner peripheral edge of a substrate portion 49b. The leaf spring portion 48a extends from a portion, to which the base portion is connected, of the inner peripheral edge of the substrate portion 49b toward the opposite side (upper side in FIGS. 18, 19, and 21) to the worm wheel 4 in the biasing direction. The leaf spring portion 48a is inclined in a direction toward the axially inner side (right side in FIGS. 18, 19, and 21) as it goes toward the opposite side to the worm wheel 4. Then, in a case of the present embodiment, in a state where an outside diameter side portion of the substrate portion 49b is held in the axial direction between the outer end surface of the guide member 28d and the inner surface of the bottom plate portion 23 of the cap 21, the tip portion of the leaf spring portion 48a is in elastic contact with the outer surface of the slide member 26g. In this manner, based on resilience of the leaf spring portion 48a, the slide member 26g is biased axially inward.

Other configurations and operations are the same as those in the above-described case of the first embodiment, and thus repeated illustration and description will be omitted.

Without being limited to the above-described embodiments, the present invention can be modified or improved, and the above-described embodiments can be appropriately combined with each other within the embodiment-applicable scope.

For example, when the electric power steering device according to the present invention is embodied, the slide member or the guide member does not necessarily have the whole-circumferentially linked annular shape (for example, a cylindrical shape). A semi-annular member (for example, semi-cylindrical member, preferably, a member whose central angle is larger than 180 degrees) which is located on the opposite side to the worm wheel in the direction in which the biasing means biases the tip portion of the worm shaft may be employed.

In addition, when the present invention is embodied, without being limited to those which are used according to the above-described respective embodiments, the biasing member or the adjusting elastic member can employ elastic members such as various springs and rubber or bolts.

In addition, when the present invention is embodied, structures according to the respective embodiments can be appropriately combined with each other. For example, when the present invention is embodied, with regard to the structures according to the above-described second to fifth embodiments and seventh to ninth embodiments (including the modification examples), the direction in which the biasing means biases the tip portion of the worm shaft toward the worm wheel via the tip side spring can also be changed to the direction employed according to the above-described sixth embodiment.

In addition, when the present invention is embodied, without being limited to a column-assist type as described in each example according to the above-described embodiments, an assist type of the electric power steering device may be a pinion-assist type or a rack-assist type. In a case of the pinion-assist type, a worm wheel is fixedly supported by an input shaft (pinion shaft) of a steering gear unit which is a rotary shaft. In addition, in a case of the rack-assist type, the worm wheel is fixedly supported by the rotary shaft arranged near a portion separated from the input shaft which is one portion in the axial direction of a rack configuring the steering gear unit.

This application is based upon and claims the benefit of priority from Japanese Patent Application No. 2014-196278, filed on Sep. 26, 2014, Japanese Patent Application No. 2014-225184, filed on Nov. 5, 2014, Japanese Patent Application No. 2014-262973, filed on Dec. 25, 2014, and Japanese Patent Application No. 2015-025387, filed on Feb. 12, 2015, the entire contents of which are incorporated herein by reference.

REFERENCE SIGNS LIST

1 STEERING WHEEL
2 STEERING SHAFT
3, 3a HOUSING
4 WORM WHEEL
5 WORM GEAR
6, 6a WORM SHAFT
7 ELECTRIC MOTOR
8, 8a BASE SIDE BEARING
9, 9a TIP SIDE BEARING
10, 10a to 10c HOLDING RECESS
11 HOLDER
12 BUSH
13 PRELOAD PAD
14 COIL SPRING
15 INTERMEDIATE SHAFT
16 STEERING GEAR UNIT
17 INPUT SHAFT
18 SMALL DIAMETER PORTION
19 INNER RING
20 OUTER RING
21 CAP
22 FITTING CYLINDER PORTION
23 BOTTOM PLATE PORTION
24 OUTWARD FLANGE PORTION
25, 25a to 25h BIASING MEANS
26, 26a to 26g SLIDE MEMBER
27, 27a, 27b LEAF SPRING
28, 28a To 28d GUIDE MEMBER
29, 29a ELASTIC RING
30, 30a FIRST INCLINED CYLINDRICAL FACE PORTION
31, 31a STEPPED SURFACE
32, 32a SECOND INCLINED CYLINDRICAL FACE PORTION
33 LOCKING GROOVE
34 O-RING
35 LOCKING GROOVE
36 O-RING
37 STOPPER PROJECTION
38 BOTTOM PLATE PORTION
39 CLOSING PLATE PORTION
40 SCREW HOLE
41 STUD BOLT
42 SNAP RING
43 ELASTIC RING
44 ENGAGEMENT RECESS
45 ENGAGEMENT PROJECTION
46 LOCKING PORTION
47, 47a, 47b BIASING PLATE
48, 48a LEAF SPRING PORTION
49, 49a, 49b SUBSTRATE PORTION
50 ENGAGEMENT PROJECTION
51 SPLIT ELEMENT
52 PLANAR PORTION
53 PLANAR PORTION
54 LEAF SPRING
55 CIRCULAR RING-SHAPED PLATE PORTION
56 CONNECTION PLATE PORTION
57 SPRING PLATE PORTION
58 INWARD FLANGE PORTION
59 FIRST CUT PORTION
60 SECOND CUT PORTION
61 OUTWARD ENGAGEMENT PROJECTION
62 INWARD ENGAGEMENT PROJECTION
63 OUTWARD FLANGE PORTION

The invention claimed is:

1. An electric power steering device comprising:
a housing;
a rotary shaft that is rotatably disposed in the housing;
a worm wheel that is supported concentrically with the rotary shaft inside the housing, and that rotates with the rotary shaft;
a worm shaft that has a worm gear in an axially intermediate portion, and that causes the worm gear to mesh with the worm wheel;
a base side bearing that supports a base portion of the worm shaft so as to be rotatable in the housing;
a tip side bearing that supports a tip portion of the worm shaft so as to be rotatable in the housing;
an electric motor whose tip portion of an output shaft engages with the base portion of the worm shaft so that a rotating force can be transmitted; and
biasing means for biasing the worm gear toward the worm wheel by biasing the tip portion of the worm shaft against the worm wheel side and causing the worm shaft to oscillate,
wherein the tip side bearing is externally fitted to and supported by the tip portion of the worm shaft,
wherein the biasing means includes
a slide member that is disposed so as to be displaceable in a longitudinal direction of the worm shaft between an outer peripheral surface of the tip side bearing and an inner peripheral surface of the housing, and that has a first inclined cylindrical face portion which is inclined to a central axis of the tip side bearing on any one peripheral surface of the outer peripheral surface and the inner peripheral surface, a second inclined cylindrical face portion that is disposed with respect to the housing or the tip side bearing in a state where displacement in the longitudinal direction of the worm shaft is hindered, and that is fitted to the first inclined cylindrical face portion, and a biasing member that biases the slide member toward a base side of the worm shaft in the longitudinal direction of the worm shaft, wherein the biasing means biases the tip portion of the worm shaft against the worm wheel side, in response to an operation in which the biasing member biases the slide member toward the base side of the worm shaft in the longitudinal direction of the worm shaft, based on an operation in which the slide member or a member having the second inclined cylindrical face portion is displaced to the worm wheel side, wherein the slide member has the first inclined cylindrical face portion on the outer peripheral surface, wherein the second inclined cylindrical face portion is formed on an inner peripheral surface of a guide member internally fitted to the housing, or is formed integrally with the housing, and wherein in an one fitting portion of a fitting portion between the outer peripheral surface of the tip side bearing and the inner peripheral surface of the slide member, a fitting portion between the first inclined cylindrical face portion and the second inclined cylindrical face portion, and a fitting portion between the outer peripheral surface of the guide member and the inner peripheral surface of the housing, an adjusting elastic member which applies resilience directed toward the worm wheel side to a member present on an inner diameter side of the fitting portion is held.

2. The electric power steering device according to claim 1, wherein the biasing means biases the tip portion of the worm shaft toward the worm wheel in a direction of a bisector between a vector of a component force inside a virtual plane orthogonal to the worm shaft of a meshing reaction force applied to the worm shaft from the meshing portion between the worm wheel and the worm gear when a steering wheel is rotated to one side in the rightward and leftward directions, and a vector of a component force inside a virtual plane orthogonal to the worm shaft of a meshing reaction force applied to the worm shaft from the meshing portion when the steering wheel is rotated to the other side in the rightward and leftward directions.

3. The electric power steering device according to claim 1, wherein the slide member is made in a partially cylindrical shape.

4. The electric power steering device according to claim 3, wherein in a state where an outer peripheral portion on a side face of a single plate-shaped member is brought into contact with an end face opposite to the base side of the worm shaft among both end faces of the slide member in the axial direction, the biasing member biases the slide member toward the base side of the worm shaft via the plate-shaped member.

5. The electric power steering device according to claim 4, further comprising:

a cap that closes an outer end opening of the inner peripheral surface of the housing, wherein the biasing member is in contact with an inner surface of a bottom plate portion of the cap, and wherein a contact portion where an end face of the slide member which is opposite to the base side of the worm shaft is in contact with an outer peripheral portion of the side face of the plate-shaped member, and a contact portion where the biasing member is in contact with the inner surface of the bottom plate portion of the cap are deviated from each other in the longitudinal direction of the worm shaft.

6. The electric power steering device according to claim 1, wherein the slide member includes multiple split elements which are arranged apart from each other in a circumferential direction.

7. The electric power steering device according to claim 6, wherein in a state where an outer peripheral portion on a side face of a single plate-shaped member is brought into contact with an end face opposite to the base side of the worm shaft among both end faces of the slide member in the axial direction, the biasing member biases the slide member toward the base side of the worm shaft via the plate-shaped member.

8. The electric power steering device according to claim 7, further comprising:

a cap that closes an outer end opening of the inner peripheral surface of the housing, wherein the biasing member is in contact with an inner surface of a bottom plate portion of the cap, and wherein a contact portion where an end face of the slide member which is opposite to the base side of the worm shaft is in contact with an outer peripheral portion of the side face of the plate-shaped member, and a contact portion where the biasing member is in contact with the inner surface of the bottom plate portion of the cap are deviated from each other in the longitudinal direction of the worm shaft.

9. The electric power steering device according to claim 1, wherein the slide member is made in a whole-circumferentially linked annular shape, and wherein the first inclined cylindrical face portion is formed in only a portion in the circumferential direction on a peripheral surface of the slide member.

10. An electric power steering device comprising:
a housing;
a rotary shaft that is rotatably disposed in the housing;
a worm wheel that is supported concentrically with the rotary shaft inside the housing, and that rotates with the rotary shaft;
a worm shaft that has a worm in an axially intermediate portion, and that causes the worm gear to mesh with the worm wheel;
a base side bearing that supports a base portion of the worm shaft so as to be rotatable in the housing;
a tip side bearing that supports a tip portion of the worm shaft so as to be rotatable in the housing;
an electric motor whose tip portion of an output shaft engages with the base portion of the worm shaft so that a rotating force can be transmitted; and biasing means for biasing the worm ear toward the worm wheel by biasing the tip portion of the worm shaft against the worm wheel side and causing the worm shaft to oscillate, wherein the tip side bearing is externally fitted to and supported b die tip portion of the worm shaft, wherein the biasing means includes a slide member that is disposed so as to be displaceable in a longitudinal direction of the worm shaft between an outer peripheral surface to the tip side bearing and an inner peripheral surface of the housing, and that has a first inclined cylindrical face portion which is inclined to a central axis of the tip side bearing on any one peripheral surface of the outer peripheral surface and the inner peripheral surface, a second inclined cylindrical face portion that is disposed with respect to the housing or the tip side bearing in a state where displacement in the longitudinal direction of the worm shaft is hindered, and that is fitted to the first inclined cylindrical face portion, and a biasing member that biases the slide member toward a base side of the worm shaft in the longitudinal direction of the worm shaft, wherein the biasing means biases the tip portion of the worm shaft against the worm wheel side, in response to an operation in which the biasing member biases the slide member toward the base side of the worn shaft in the longitudinal direction of the worm shaft, based on an operation in which the slide member or a member having the second inclined cylindrical face portion is displaced to the worm wheel side, wherein a member for forming the second inclined cylindrical face portion is made in a whole-circumferentially linked annular shape, and wherein the second inclined cylindrical face portion is formed in only a portion in the circumferential direction on a peripheral surface of the member.

11. An electric power steering device comprising:

a housing;

a rotary shaft that is rotatably disposed in the housing;

a worm wheel that is supported concentrically with the rotary shaft inside the housing, and that rotates with the rotary shaft;

a worm shaft that has a worm gear in an axially intermediate portion, and that causes the worm gear to mesh with the worm wheel;

a base side bearing that supports a base portion of the worm shaft so as to be rotatable in the housing;

a tip side bearing that supports a tip portion of the worm shaft so as to be rotatable in the housing;

an electric motor whose tip portion of an output shaft engages with the base portion of the worm shaft so that a rotating force can he transmitted; and biasing means for biasing the worm gear toward the worm wheel by biasing the tip portion of the worm shaft against the worm wheel side and causing the worm shaft to oscillate, wherein the tip side bearing is externally fitted to and supported by the tip portion of the worm shaft, wherein the biasing means includes a slide member that is disposed so as to be displaceable in a longitudinal direction of the worm shaft between an outer peripheral surface of the tip side bearing and an inner peripheral surface of the housing and that has a first inclined cylindrical face portion which is inclined to a central axis of the tip side bearing on any one peripheral surface of the outer peripheral surface and the inner peripheral surface, a second inclined cylindrical face portion that is disposed with respect to the housing or the tip side bearing in a state where displacement in the longitudinal direction of the worm shaft is hindered and that is fitted to the first inclined cylindrical face portion, and a biasing member that biases the slide member toward a base side of the worm shaft in the longitudinal direction of the worm shaft, wherein the biasing means biases the tin portion of the worm shaft against the worm wheel side, in response to an operation in which the biasing member biases the slide member toward the base side of the worm shaft in the longitudinal direction of the worm shaft, based on an operation in which the slide member or a member having the second inclined cylindrical face portion is displaced to the worm wheel side, wherein one portion on a peripheral surface on a side having the first inclined cylindrical face portion of the slide member, and one portion on a peripheral surface on a side having the second inclined cylindrical face portion of a member having the second inclined cylindrical face portion mechanically engage with each other so as to prevent relative rotation between the slide member and the member having the second inclined cylindrical face portion.

* * * * *